United States Patent
Kobayashi et al.

(10) Patent No.: US 7,076,247 B2
(45) Date of Patent: Jul. 11, 2006

(54) COMMUNICATION SUPPORT SYSTEM, INFORMATION PROCESSING TERMINAL, RADIOTELEPHONE NETWORK, MESSAGE SERVER, AND RECORDING MEDIUM

(75) Inventors: Emiko Kobayashi, Kawasaki (JP); Tomoichi Ebata, Kawasaki (JP); Minoru Koizumi, Yokohama (JP); Katsumi Hanashima, Ibaraki-ken (JP)

(73) Assignee: Hitachi, Ltd., Tokyo (JP)

( * ) Notice: Subject to any disclaimer, the term of this patent is extended or adjusted under 35 U.S.C. 154(b) by 384 days.

(21) Appl. No.: 10/211,525

(22) Filed: Aug. 5, 2002

(65) Prior Publication Data

US 2002/0193109 A1 Dec. 19, 2002

Related U.S. Application Data

(63) Continuation of application No. 09/294,012, filed on Apr. 19, 1999.

(30) Foreign Application Priority Data

Apr. 17, 1998 (JP) ................................ 10-107782

(51) Int. Cl.
*H04Q 7/20* (2006.01)
(52) U.S. Cl. ..................................................... 455/430
(58) Field of Classification Search ................. 455/430
See application file for complete search history.

(56) References Cited

U.S. PATENT DOCUMENTS 5,740,369 A 4/1998 Yokozawa et al.

FOREIGN PATENT DOCUMENTS

| JP | 05260549 | 10/1993 |
|---|---|---|
| JP | 06086354 | 3/1994 |
| JP | 06152512 | 5/1994 |
| JP | 06165247 | 6/1994 |
| JP | 07050868 | 2/1995 |
| JP | 07322340 | 12/1995 |
| JP | 08018523 | 1/1996 |
| JP | 08126062 | 5/1996 |
| JP | 09027951 | 1/1997 |
| JP | 984086 | 3/1997 |
| JP | 09084087 | 3/1997 |
| JP | 10164627 | 6/1998 |
| JP | 10336739 | 12/1998 |
| JP | 11032049 | 2/1999 |

OTHER PUBLICATIONS

"Mobile Communication Handbook", Published by Oshima, Nov. 15, 1995, pp. 304-307.

*Primary Examiner*—William D. Cumming
(74) *Attorney, Agent, or Firm*—Mattingly, Stanger, Malur & Brundidge, P.C.

(57) ABSTRACT

A sender of a message can transmit a message to an unspecified user merely by specifying a condition of space without specifying a recipient of the message, using an information processing terminal transmitting a message not with a user address to specify a user but with an area address (a condition of space) to specify an area within an electric wave reachable range of a radio base station; and a server converting the area address to a user address which specifies a PHS terminal currently located in the area represented by said area address and transmitting the message with a converted address to a switching equipment.

11 Claims, 21 Drawing Sheets

FIG.7

| DESTINATION | TRANSMISSION SOURCE USER ADDRESS | DATA |
|---|---|---|

301 — DESTINATION
302 — TRANSMISSION SOURCE USER ADDRESS
303 — DATA

FIG.8

| AREA No. | PHS No. |
|---|---|
| AREA 1 | #1, #4 |
| AREA 2 | |
| AREA 3 | #2 |
| ⋮ | ⋮ |

402 — AREA No.
403 — PHS No.
401 POSITION INFORMATION MANAGEMENT TABLE

FIG.9

| AREA ADDRESS | AREA No. | USER ADDRESS (PHS No.) |
|---|---|---|
| plant 1 | AREA 1 | #1, #4 |
| plant 2 | AREA 2 | |
| plant 3 | AREA 3 | #2 |
| ⋮ | ⋮ | ⋮ |

502 — AREA ADDRESS
503 — AREA No.
504 — USER ADDRESS (PHS No.)
501 POSITION INFORMATION MANAGEMENT TABLE

| MESSAGE ID | TRANSMISSION SOURCE USER ADDRESS | DESTINATION USER ADDRESS (PHS No.) |
|---|---|---|
| M1 | #a | #4 |
| M2 | #b | |
| M3 | #c | #2 |
| ⋮ | ⋮ | ⋮ |

1102 / 1103 / 1104

1101 TRANSMISSION SOURCE MANAGEMENT TABLE

| DESTINATION PHS No. | TRANSMISSION SOURCE TELEPHONE No. |
|---|---|
| #4 | 1000 |
| #2 | 2000 |
| ⋮ | ⋮ |

1701 TRANSMISSION SOURCE MANAGEMENT TABLE

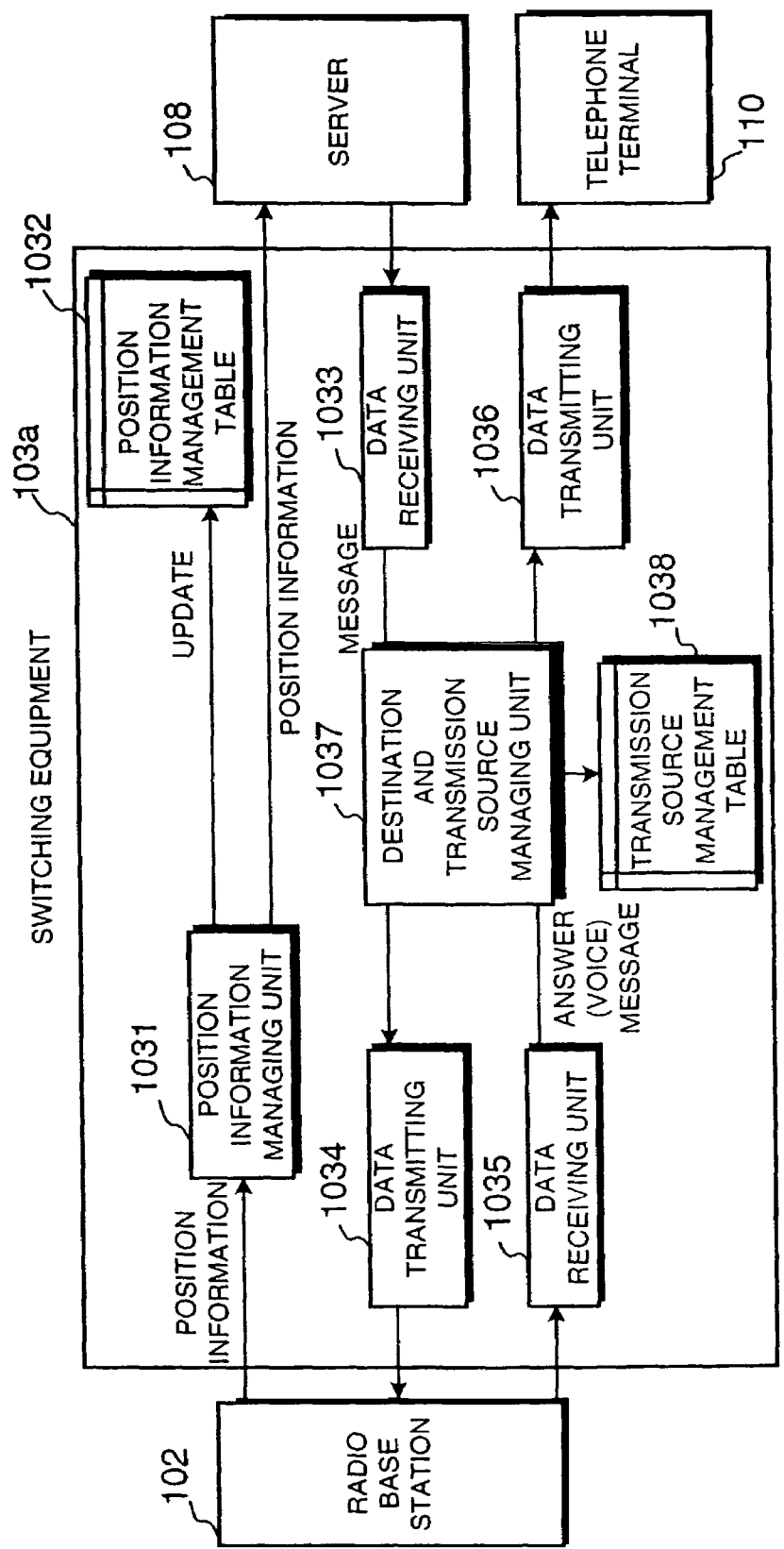

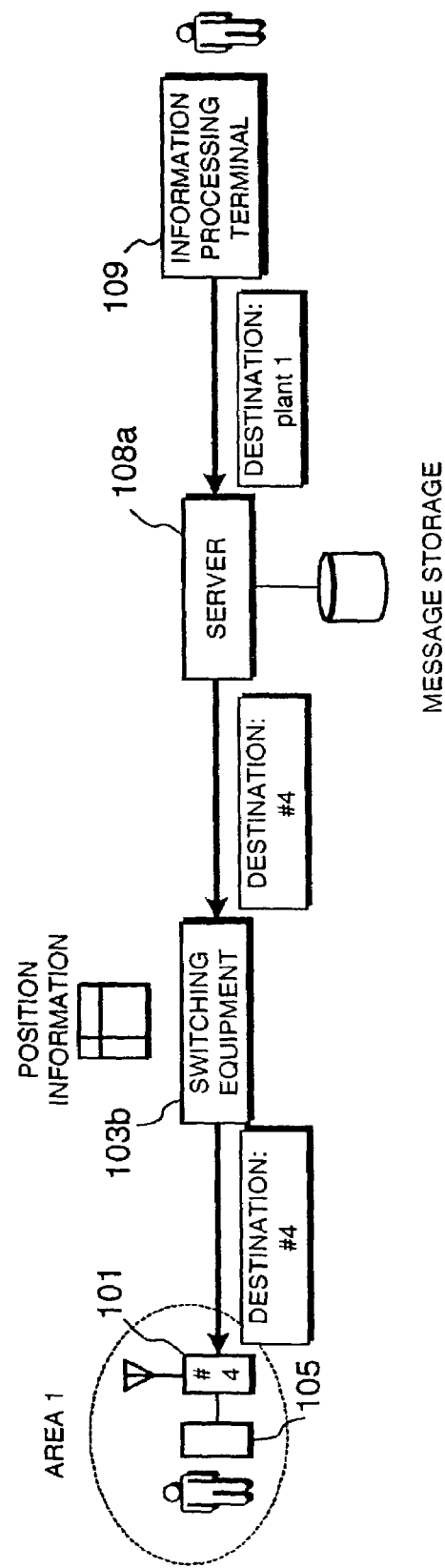

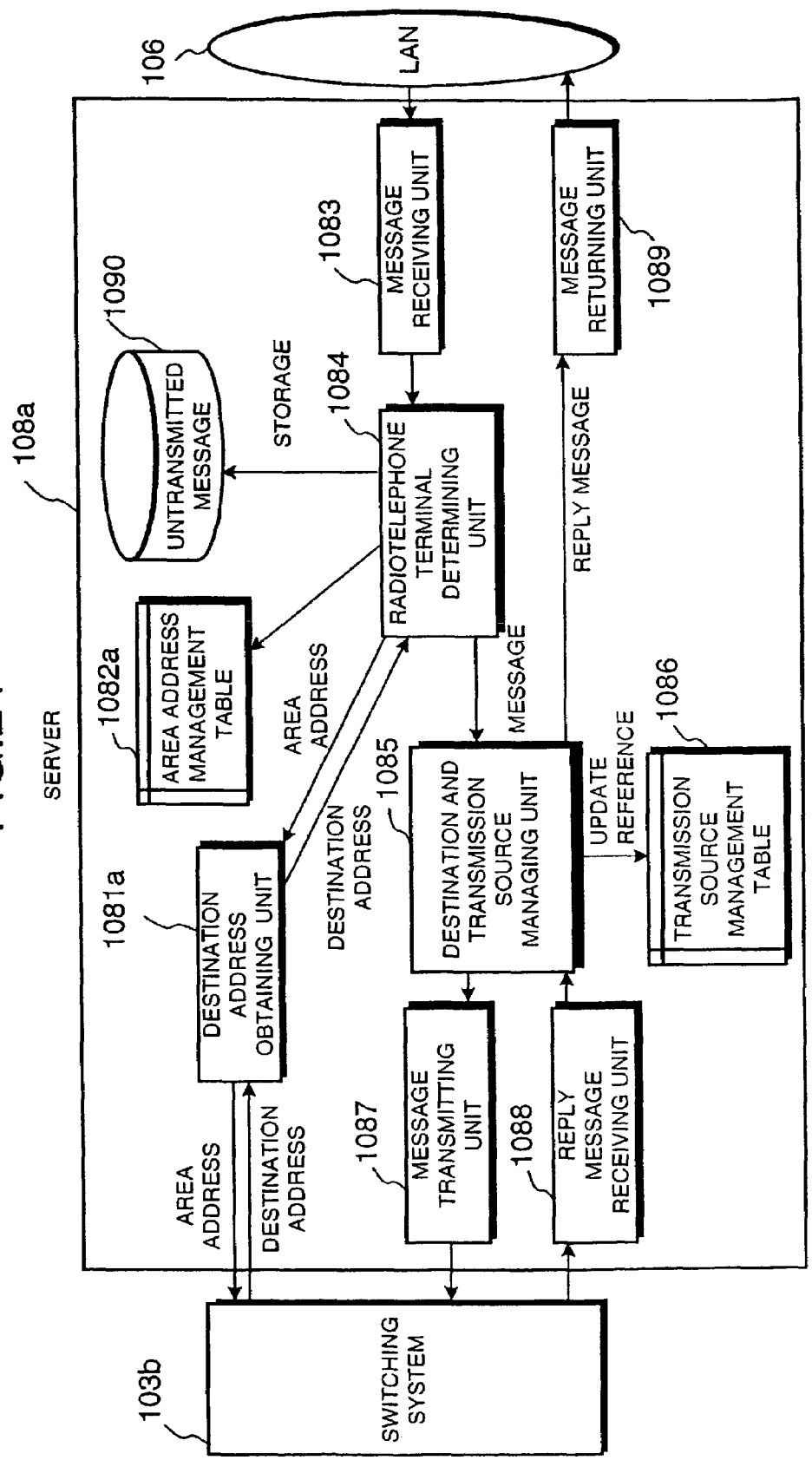

FIG.25

| AREA ADDRESS | AREA No. |
|---|---|
| plant 1 | AREA 1 |
| plant 2 | AREA 2 |
| plant 3 | AREA 3 |
| ⋮ | ⋮ |

1901 AREA ADDRESS MANAGEMENT TABLE

```
*01:PLANT1(9011)
*02:PLANT2(9012)
*03:PLANT3(9013)
*04:PLANT4(9014)
```

COMMUNICATION SUPPORT SYSTEM, INFORMATION PROCESSING TERMINAL, RADIOTELEPHONE NETWORK, MESSAGE SERVER, AND RECORDING MEDIUM

The present application is a continuation of application Ser. No. 09/294,012, filed Apr. 19, 1999, the contents of which are incorporated herein by reference.

BACKGROUND OF THE INVENTION

1. Field of the Invention

The present invention relates to a communication support system capable of sending a message to the most suitable user with regard to space (or space and time) even if the sender of the message does not specify the receiver.

2. Description of Related Art

As is generally known, the private paging system and the liaison communication system works are private radio communication systems used in service areas, such as within the premises or in limited regions. Such private radio communication systems are installed on the assumption that people communicate by voice or simple information transfer is carried out from a host station to subordinate stations. PHS (personal handyphone system) is a radio system having a high potential for data transmission. With regard to the private radio system and PHS, there is a detailed description in "Mobile Communications Handbook" (jointly edited by Tadao Saito and Keizo Tachikawa, published by Ohmsha, Nov. 15, 1995), for example.

As a system that utilizes position information in a private branch exchange, there is a plant network system disclosed in Japanese Patent Application No. Hei 8-313837. This system transmits, by using PHS service, data necessary for plant maintenance to places the plant maintenance person move to in advance.

In the roaming of the PHS terminal, because the areas where the PHS terminal moves around can be grasped by the PHS service, the PHS terminal can communicates freely in areas other than the preliminarily registered area. With regard to the roaming methods, a method is revealed in Japanese Patent Application Laid-Open No. Hei 7-322340, for example.

As is well known, message transfer service by a radio system is available with information processing terminals or radio paging portable receivers. In this kind of service, messages are addressed to individuals, and the sender is required to specify the address of the receiver or the number of the radio paging portable receiver when sending a message. With regard to the message transfer method to a radio paging portable receiver, a method is revealed in Japanese Patent Application Laid-Open No. Hei 6-86354, for example.

As mentioned above, in the prior art, it is possible to obtain position information about the user and transfer a message to the user by using a radio system. However, because the sender of a message is required to specify the address of a person as a receiver of the message, it is not always possible to provide message transmission service that can respond to changes in the location or situation of a message receiver.

When there is a message to any user in a given area at a given time, it is more often important to send the message to that area at that time rather than send it to the person.

In a plant operation monitoring system, for example, the plant maintenance person performs periodic inspection in which he/she takes measurements and inspect the equipment in the field. If there are a number of maintenance persons in the plant and a request is issued to check a specific device, an instruction message should preferably be transmitted not to a specific maintenance person but to a maintenance person closest to that device.

Suppose that a message is going to be sent to a person at place B at time A and the request given is that the recipient of the message may be anybody.

In the past, the sender of a message is required to follow a two-step procedure:

Step 1: When time A comes, tracing is performed to find who is at place B.

Step 2: The user at place B is determined, and a message is sent to an address of that user.

SUMMARY OF THE INVENTION

The present invention enables transmission of a message only by a single step by regarding time A and place B as a kind of address.

More specifically, the object of the present invention is to make it possible for a message sender to transmit a message only by specifying a condition of space (or conditions of space and time) to an unspecified user who meets the condition or conditions without specifying the recipient of the message. Therefore, the present invention can provide a communication support system that enables a user moving from place to place to receive a message appropriate to that specified place (or specified place and time).

To accomplish the above objects, according to the present invention, there is provided a communication support system connected to a radiotelephone network which includes a plurality of radio base stations set up to cover different areas, and a switching equipment having a function for managing position information about radiotelephone terminals which are currently present in the respective areas, wherein the communication support system comprises:

at least one information processing terminal and a server connected with each other through a network, wherein the information processing terminal includes:

first message transmitting means for transmitting a message with a desired area as the destination to the server, and wherein the server includes:

position information obtaining means for obtaining position information managed by the switching equipment;

message receiving means for receiving a message transmitted from the information processing terminal;

radiotelephone terminal determining means for determining, on the basis of position information obtained by the position information obtaining means, radiotelephone terminals present in an area of an address of the message received by the message receiving means; and second message transmitting means for setting at least one of the radiotelephone terminals determined by the radiotelephone terminal determining means as addresses of the message received by the message receiving means and transmitting the message to the switching equipment.

According to the present invention, when a user at an information processing terminal transmits a message addressed to an area, the message is bound to reach users of radiotelephone terminals in the addressed area. Therefore, the user at the transmission source, by simply specifying a condition of space (an area), can transmit a message to an unspecified user who meets the condition. A user moving about from place to place can receive a message appropriate to that specified place.

Note that in the present invention, it may be arranged that the position information obtaining means can obtain position information by making periodical access to the information being managed by the switching equipment or receiving position information sent from the switching equipment.

It may be arranged that the second message transmitting means can delay transmitting a message for which the radiotelephone terminal could not be determined by the radiotelephone terminal determining means until the radiotelephone terminal is determined. Or otherwise, it may be arranged that the second message transmitting means can transmit the message to the switching equipment so that the message is sent to all radiotelephone terminals determined by the radiotelephone terminal determining means.

The server may further include destination and transmission source managing means for managing a radiotelephone terminal to which the message is addressed and the information processing terminal at the message transmission source for each message transmitted by the second message transmitting means; reply message receiving means for receiving from the switching equipment a reply message from the radiotelephone terminal that received the message from the second message transmitting means; message returning means for transmitting the reply message received by the reply message receiving means to the information processing terminal associated with radiotelephone terminal which transmitted the reply message by the destination and transmission source managing means.

It may be arranged that the message receiving means can receive from the switching equipment a message transmitted from a radiotelephone terminal by the information processing terminal connected to the radiotelephone terminal when the information processing terminal which is connected to the radiotelephone can transmit to the server a message addressed to a desired area by using the radiotelephone terminal.

In the present invention, the first message transmitting means specifies time information which shows time when the server should transmit the message, in a message to be transmitted to the server, wherein the second message transmitting means changes the address of the message to the address of a radiotelephone terminal determined by the radiotelephone terminal determining means, and transmits the message to the switching equipment at a transmission time specified in the message in time information.

According to the above constitution, if the user at the information processing terminal transmits a message addressed to an area by adding time information to the message, when time specified in the time information comes, the message will reach the user at the radiotelephone terminal present in the area written as the address of the message. Therefore, the user at the message-transmission source, by merely specifying conditions of space (area) and time (time information), can transmit a message to an unspecified user conforming to the conditions. For this reason, the users moving from place to place can receive a message appropriate to that place and that time.

In the present invention, the server may further include transmission source managing means for managing the information processing terminals of the senders of respective messages that are received by the message receiving means. Furthermore, with regard to messages for which the radiotelephone terminals could not be determined by the radiotelephone terminal determining means within a predetermined time limit, the second message transmitting means may be arranged to send the message back to the information processing terminal, which is related with the message and managed by the transmission source managing means.

BRIEF DESCRIPTION OF THE DRAWINGS

FIG. 7 is an explanatory diagram showing the format of a message transmitted from the information processing terminal in the first embodiment of the present invention;

FIG. 8 is an explanatory diagram showing the constitution of the position information management table managed by the switching equipment in the first embodiment of the present invention;

FIG. 9 is an explanatory diagram showing the constitution of the position information management table managed by the server in the first embodiment of the present invention;

FIG. 21 is a functional block diagram of the switching equipment 103*a* shown in FIG. 19;

FIG. 23 is a conceptual diagram showing the flow of message in the third embodiment of the present invention;

FIG. 24 is a functional block diagram of the server 108*a* shown in FIG. 23;

FIG. 25 is an explanatory diagram showing the constitution of the area address management table managed by the server in the third embodiment of the present invention;

DETAILED DESCRIPTION OF THE PREFERRED EMBODIMENTS

The preferred embodiments of the present invention will be described with reference to the accompanying drawings.

First Embodiment

Description will start with a first embodiment of the present invention.

Figure 1:
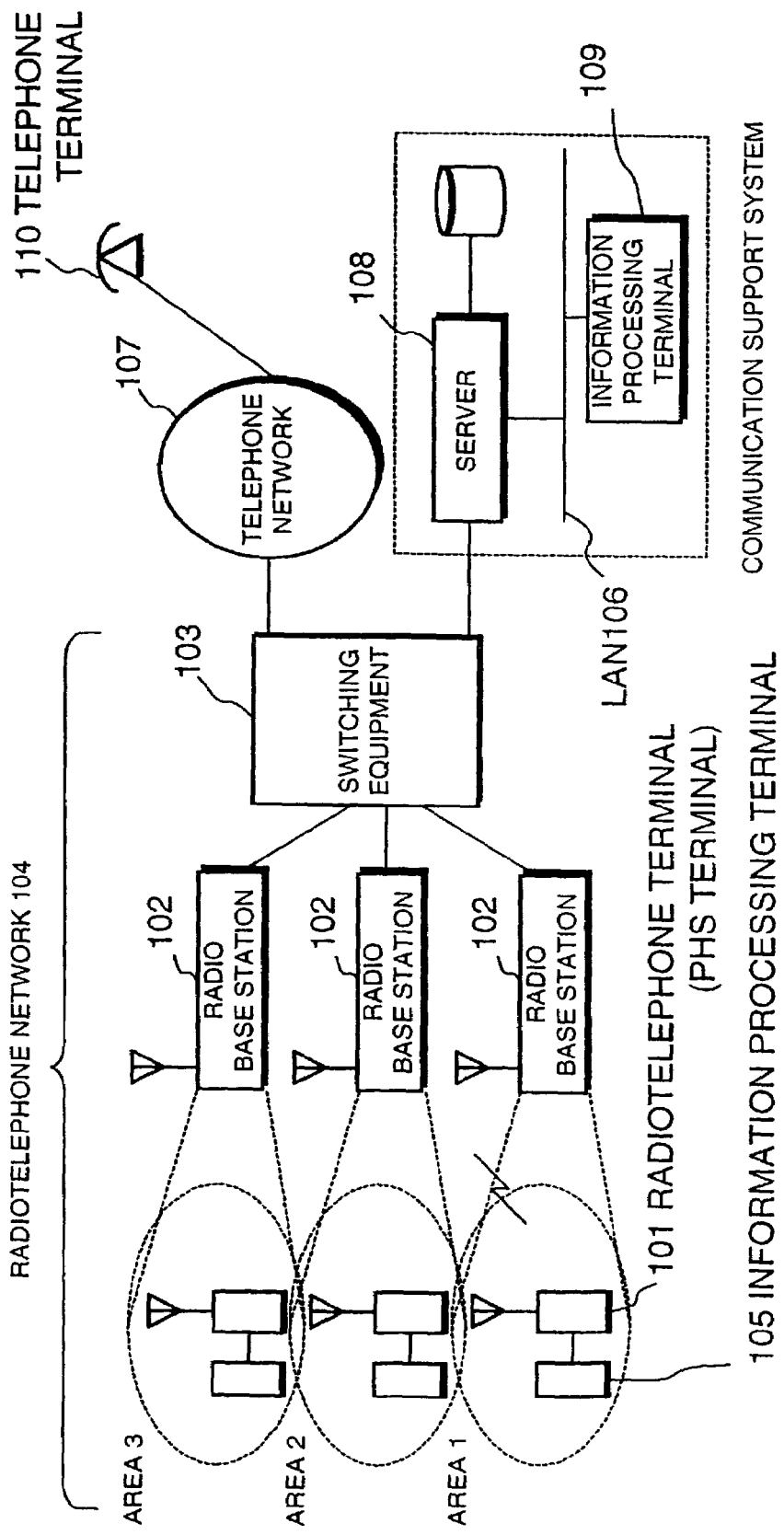
FIG. 1 is a system block diagram of a network system to which a communication support system according to a first embodiment of the present invention is applied.

FIG. 1 is a system block diagram of a network system to which the communication support system according to the first embodiment is applied.

As shown in FIG. 1, the communication support system according to the first embodiment has a server 108 and information processing terminal 109, such as a PC (personal computer), a WS (workstation), etc. connected to LAN 106.

And the communication support system according to the first embodiment is connected to a radiotelephone network 104, which includes a plurality of radiotelephone terminals 101, a plurality of radio base stations 102, and a switching equipment 103. A portable information processing terminal 105 is connected to each of the radiotelephone terminals 101. A switching equipment 103 is connected to a telephone network 107, which has a plurality of telephone terminals 110 connected thereto.

The radiotelephone terminal 101 and the information processing terminal 105 are defined as separate devices. However, a radiotelephone terminal 101 and an information processing terminal 105 may be a unified body, such as an information processing terminal with a built-in transmitter.

Here, as a radiotelephone terminal 101, a PHS (personal handyphone system) terminal is used, which has a narrow electric wave reachable range of about 200 m from a radiotelephone base station 102 and also has a high potential for data transmission.

Description will now be given of the devices constituting the network system shown in FIG. 1.

Figure 2:
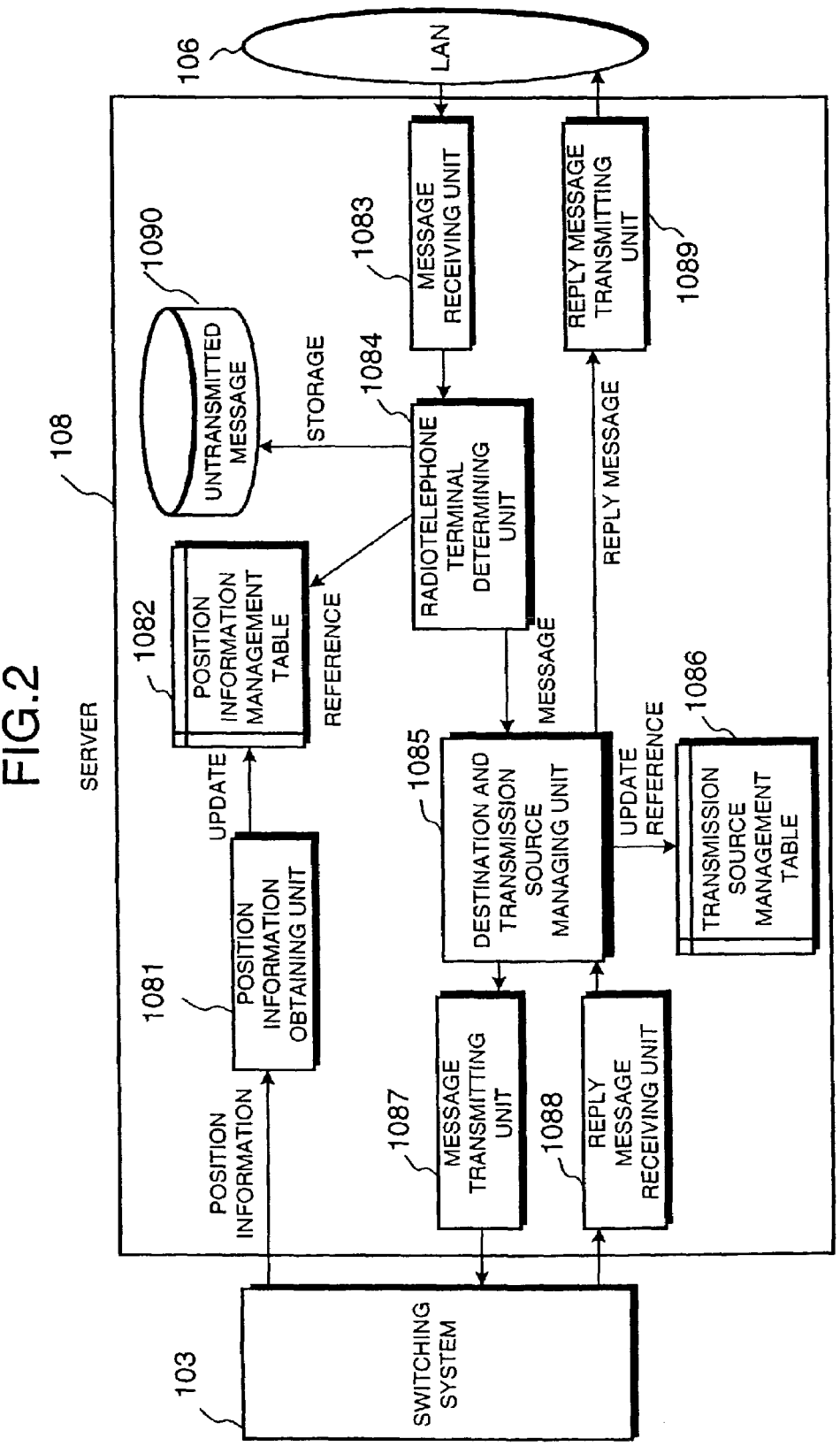
FIG. 2 is a functional block diagram of the server 108 shown in FIG. 1.

FIG. 2 is a functional block diagram of the server 108.

In FIG. 2, the switching equipment 103 obtains position information, and by this position information, a position information obtaining means 1081 updates the position information management table in a memory 1082 for the table. A message receiving unit 1083 receives a message transferred from the information processing terminal 109 through LAN 106. On receiving the message from the message receiver 1083, a radiotelephone terminal determining unit 1084, by referring to the position information management table in the table memory 1082, determines a radiotelephone terminal 101 present in an area of an address which is added to the message, as the destination address of the message. A destination and transmission source managing unit 1085 changes the destination address of the message, transmitted from the information processing terminal 109 and received by the message receiving unit 1083, from the area address on the message to the number (user address) of the radiotelephone terminal 101 determined by the radiotelephone terminal determining unit 1084. The destination and transmission source managing unit 1085 further relates the changed address to the information processing terminal 109 at the transmission source, and registers the address in the transmission source managing table stored in the transmission source managing table memory 1086. A message transmitting unit 1087 transmits the message, in which the destination and the sending station were changed, to the switching equipment 103. A reply message receiving unit 1088 receives from the switching equipment 103 a reply message transmitted from the radiotelephone terminal 101. When receiving the reply message, the destination and transmission source managing unit 1085 determines the destination of the reply message from the sender of the message by referring to the transmission source management table stored in the transmission source management table memory 1086, and changes the reply message to one with the determined reply address. A reply message transmitting unit 1089 sends onto LAN 106 the reply message for which the destination was determined by the destination and transmission sourc6 managing unit 1085. The user addresses of the radiotelephone terminals 109 present at this moment in the areas are registered on the position information management table stored in the position information management table memory 1082 for every area address. With regard to each message received from the radiotelephone terminal determining unit 1084, the address of the radiotelephone terminal 101, which is the destination address of message and the address of the information processing terminal 109 which is the transmission source are registered on the transmission source information management table stored in the transmission source information management table memory 1086. Note that a memory 1090 for untransmitted messages stores those messages that are not immediately transmitted to the switching equipment 103 out of all messages received at the message receiving unit 1083.

Figure 11:
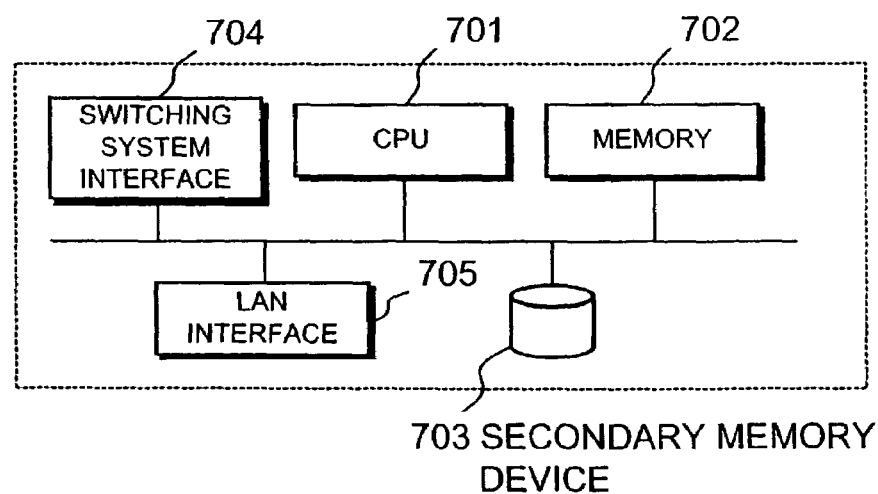
FIG. 11 is a hardware block diagram of the server in the first embodiment of the present invention.
Figures 20, 22:
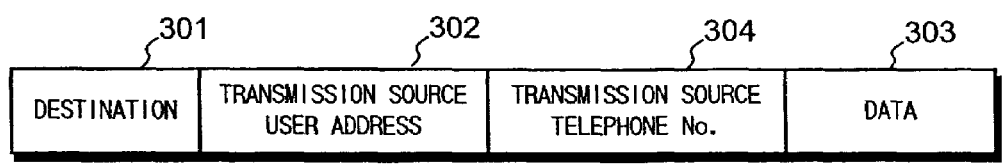
FIG. 20 is an explanatory diagram showing the format of a message transmitted from the information processing terminal in the second embodiment of the present invention.
FIG. 22 is a conceptual diagram showing the flow of messages in a third embodiment of the present invention.

The server 108 in FIG. 2 is realized in an information processing unit including CPU 701, a memory 702, a secondary memory device 703, a switching equipment interface 704, and a LAN interface 705 as shown in FIG. 11 20 as a process controlled by CPU 701, which loads a program from the secondary memory device 703 into the memory 702 and executes the program switching equipment.

Figure 3:
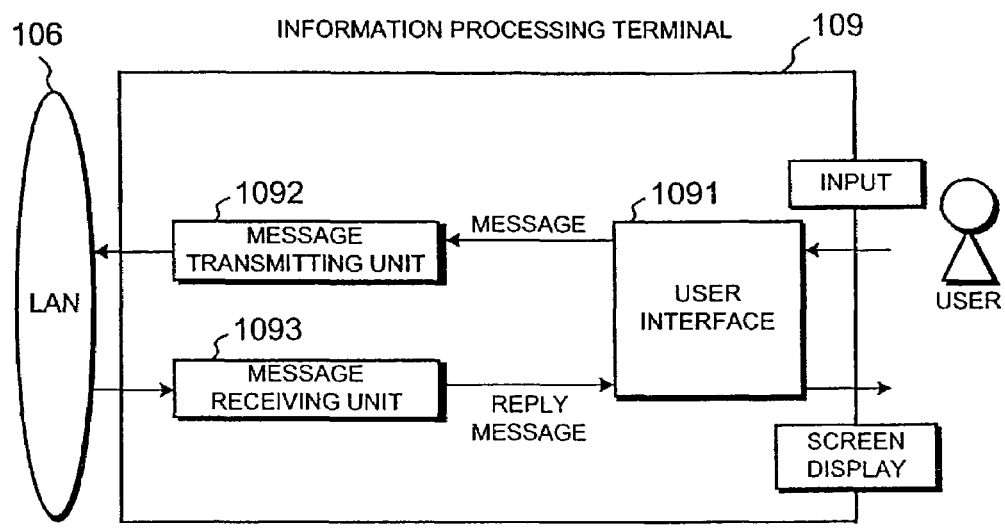
FIG. 3 is a functional block diagram of the information processing terminal 109 shown in FIG. 1.

FIG. 3 is a functional block diagram of the information processing terminal 109 shown in FIG. 1.

In FIG. 3, a user interface unit 1091 accepts an input message from the user, and displays the accepted message or a reply message. A message transmitting unit 1092 sends onto LAN 106 the message with an area address accepted through the user interface 1091. A message receiving unit 1093 receives a reply message addressed to itself, and sends the reply message to the user interface 1091.

The information processing terminal shown in FIG. 3 is realized as a process controlled by CPU 701 which loads a program from the secondary memory device 703 into the memory 702 and executes the program when the server is formed as an information processing unit shown in FIG. 11 with the switching interface 704 omitted.

The information processing terminal 105 shown in FIG. 1 is basically the same as the one shown in FIG. 3 excepting that the message transmitting unit 1092 and the message receiving unit 1093 are externally connected to radiotelephone terminals 101, not to the LAN 106 as in FIG. 3.

Figure 4:
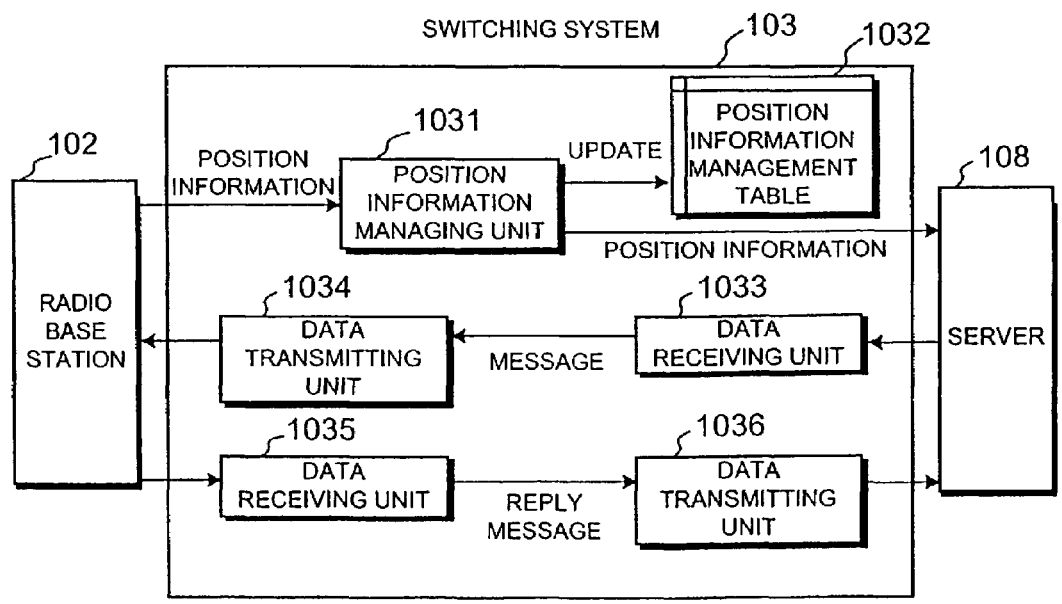
FIG. 4 is a functional block diagram of the switching equipment 103 shown in FIG. 1.

FIG. 4 is a functional block diagram of the switching equipment 103 shown in FIG. 1.

In FIG. 4, a position information managing unit 1031 obtains, from the radiotelephone terminal 101 supplied with power source, information about which area the radiotelephone terminal 101 is located in, and manages the position information by the position information management table stored in the position information management table memory 1032. When power is supplied and periodically after power has been supplied to the radiotelephone terminal 101, the radiotelephone terminal 101 issues a position information signal. The position information of the radiotelephone terminal 101 is obtained by checking through which radio base station 102 the position information signal thus issued was received. The switching equipment 103, which has obtained position information of the radiotelephone terminal 101, refers to the position information management table stored in the position information management table memory 1032, and if there is any change in the user's area (in other words, in the corresponding radio base station 102 which received the position information signal), the switching equipment 103 updates the position information management table stored in the position information management table memory 1032. The position information managing unit 1031 sends the contents of the position information management table stored in the position information management table memory 1032 to the server 108 periodically or in response to a command from the server 108.

A data receiving unit 1033 receives a message sent from the server 108. A data transmitting unit 1034 obtains an area where there is the radiotelephone terminal 101 at the address added to the message received by the data receiving unit 1033 from the position information table stored in the position information management table memory 1032. The data transmitting unit 1034 transmits the message to the radiotelephone terminal 101 at its destination address through the radio base station 102 managing the area obtained. A data receiving unit 1035 receives a reply message from the radiotelephone terminal 101 through the radio base station 102. A data transmitting unit 1036 transmits the reply message received by the data receiving unit 1035 to the server 108 at the address of the reply message.

The switching equipment 103 in FIG. 4 is the same as the one conventionally used, excepting that the contents of the position information management table in the position information management table memory 1032 periodically or in response to a command from the server 108. The hardware constitution of the switching equipment is the same as the one conventionally used, and the description thereof is omitted.

Figure 5:
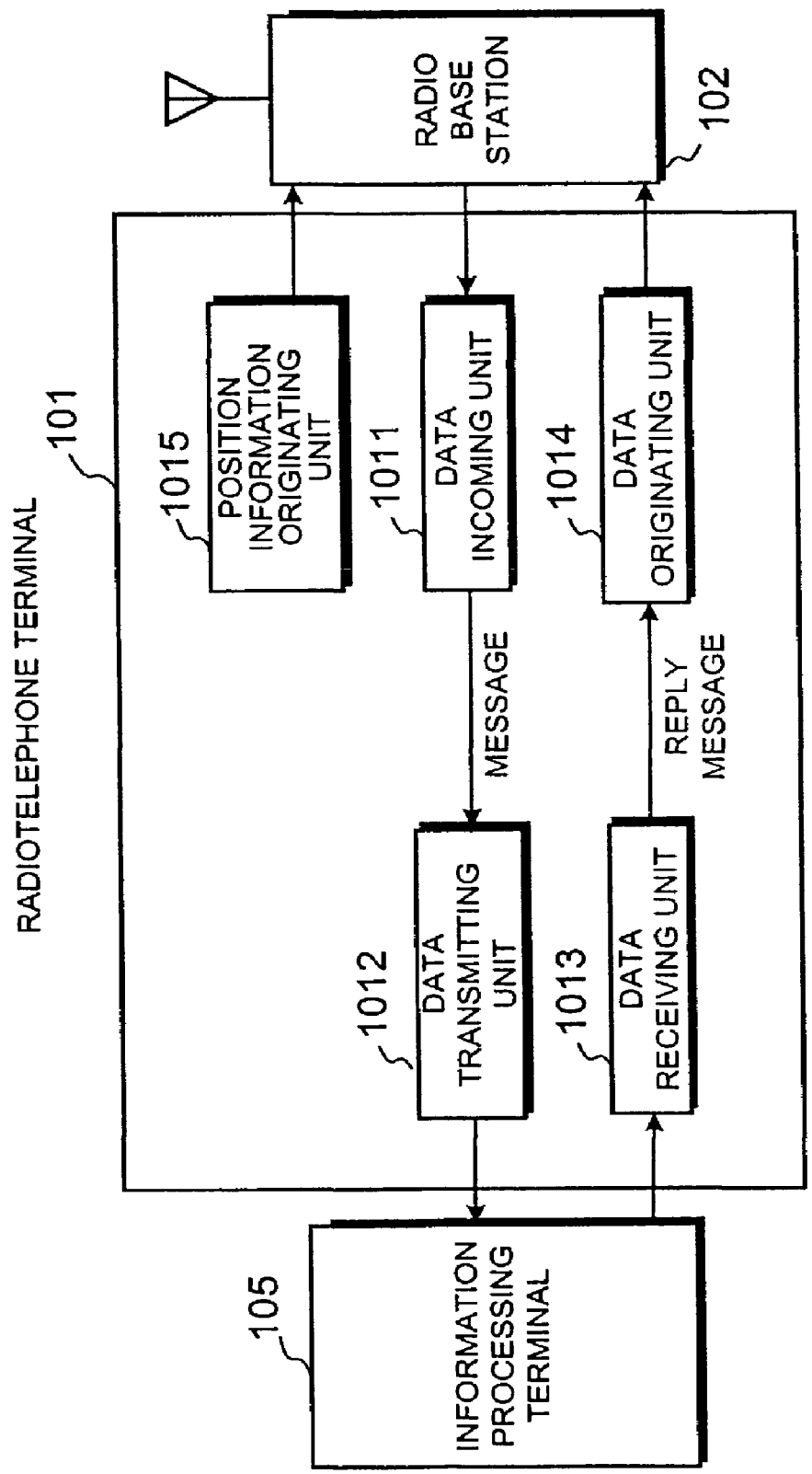
FIG. 5 is a functional block diagram of the radiotelephone terminal 101 shown in FIG. 1.

FIG. 5 is a functional block diagram of the radiotelephone terminal.

In FIG. 5, a data incoming unit 1011 performs the incoming message process, addressed to its own radiotelephone terminal, which was transmitted from the switching equipment 103 through the radio base station 102 controlling the area where the radiotelephone terminal itself exists. A data transmitting unit 1012 transmits the message, which arrived at the data incoming unit, to the information processing terminal 105 connected to itself. A data receiving unit 1013 receives a reply message sent from the information processing terminal 105 connected to itself. A data originating unit 1014 originates the reply message received at the data receiving unit 1013. The reply message is sent to the switching equipment 103 through the radio base station 102 controlling the area where the radiotelephone terminal 101 itself exists.

The position information originating unit 1015 originates a position information signal when power is supplied and periodically after power has been supplied. This position information is sent to the switching equipment 103 through the radio base station 102 controlling the area where the radiotelephone terminal 101 itself exists.

The radiotelephone terminal 101 shown in FIG. 5 is the same as those which have been conventionally used. The hardware constitution of the radiotelephone terminal 101 is the same as that of the radiotelephone terminals conventionally used and the description thereof is omitted.

Description will be given of the flow of messages in the network system configured as described above.

Figure 6:
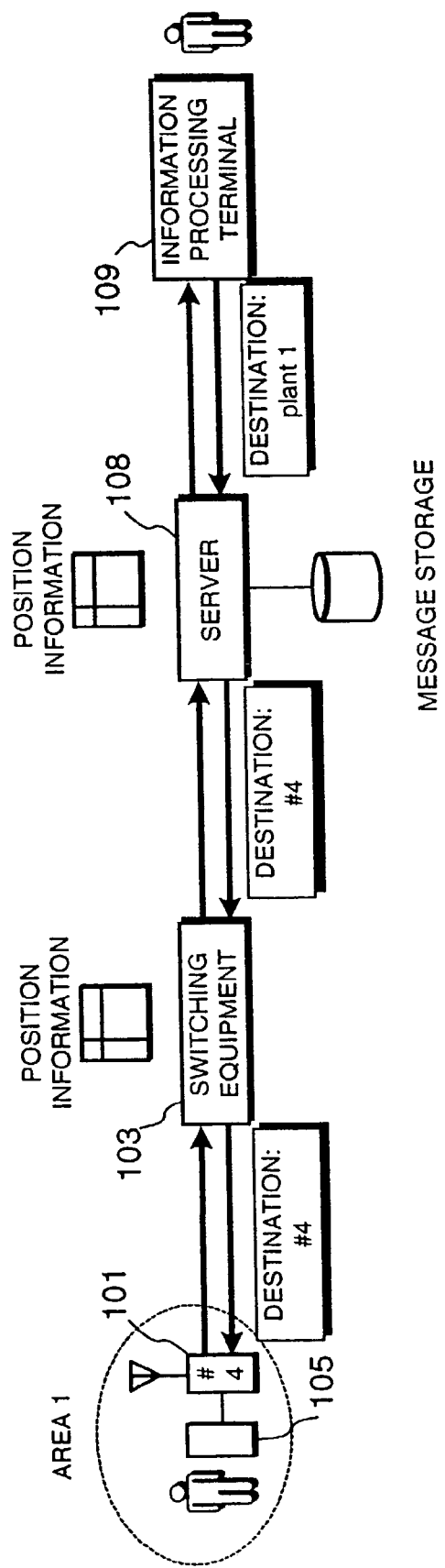
FIG. 6 is a conceptual diagram showing a flow of messages in the first embodiment of the present invention.

FIG. 6 is a conceptual diagram showing the flow of messages in the first embodiment.

As shown in FIG. 6, according to the first embodiment, a message sent from the information processing terminal 109 is transmitted by the server 108 through the switching equipment 103 to the information processing terminal 105 connected to the radiotelephone terminal 101. A reply message from the information processing terminal 105 is transmitted to the information processing terminal 109 by traveling along the same route in reverse direction. FIG. 7 is an explanatory diagram showing the format of a message transmitted from the information processing terminal 109.

As shown in FIG. 7, a message that is sent from the information processing terminal 109 consists of a destination address 301, a transmission source user address 302, and a data portion 303.

The first embodiment of the present invention makes it possible for a user at the transmission source to transmit a message to an unspecified user who meets only the condition of space (or conditions of space and time) that the sender specifies without specifying a user at a destination.

Therefore, in the first embodiment, it is arranged that not a user address that specifies the user but an area address (plant 1 in the example in FIG. 6) that specifies an electric wave reachable range is set as the destination address 301 of the message. Furthermore, in the destination address 301, a transmission waiting time or a specified transmission time may be set in addition to the area address. The area address set in the destination address 301 is for specifying a condition of space. The transmission waiting time or specified transmission time set in the destination address 301 is for specifying a condition of time.

Setting an area address and a specified transmission time may be done by the user using the user interface 1091 shown in FIG. 3.

In the first embodiment, the server 108 changes the area address to a user address of the radiotelephone terminal 101 determined by the radiotelephone terminal determining unit 1084 shown in FIG. 2 (#4 in the example in FIG. 6) in order that the message transmitted from the information processing terminal 109 is further transmitted to the information processing terminal 105 connected to the radiotelephone (PHS) terminal 101 currently located in an area indicated by the area address set in the destination address 301 of the message.

If transmission waiting time or specified transmission time has been added to the destination address 301 of the message transmitted from the information processing terminal 109, the server 108, after having changed the area address to the user address of the radiotelephone terminal 101 determined by the radiotelephone terminal determining unit shown in FIG. 2 (#4 in the example in FIG. 6), temporarily stores the message in the untransmitted message memory 1090. When the above-mentioned transmission waiting time has elapsed or specified transmission time comes, the radiotelephone terminal determining unit 1084 fetches the message from the untransmitted message memory 1090 and transmits it.

In the first embodiment, the server 108 needs to manage the position information of the radiotelephone terminals 101 for conversion of the area address set in the destination address 301 of a message transmitted from the information processing terminal 109. Therefore, description will be made of the method of managing position information.

FIG. 8 is a diagram for explaining the constitution of a position information management table 401 stored in the memory 1032 for the position information management table, which the switching equipment 103 uses in managing the position information of the radiotelephone terminals 101.

As shown in FIG. 8, each entry in the position information management table 401 stored in the position information management table memory 1032 consists of a field 402 for storing an area number as the ID number of a radio base station 102 and a field 403 for storing a PHS number as the ID number of a radiotelephone (PHS) terminal 101.

The switching equipment 103 manages PHS numbers of the PHS terminals 101 currently located in respective areas by associating them with the area numbers of the areas of the radio base stations 102. More specifically, when the position information management unit 1031 shown in FIG. 4 detects that a PHS terminal 101 moves from one area to another area, the switching equipment 103 updates the PHS number fields 403 of the areas involved in the movement.

FIG. 9 is an explanatory diagram showing the constitution of the position information management table stored in the position information management table memory 1082 which the server 108 uses for managing the position information of the radiotelephone (PHS) terminals 101.

As shown in FIG. 9, each entry of the position information management table 501 stored in the position information management table memory 1082 consists of a field 502 for storing an area address, a field 503 for storing an area number, and a field 504 for storing a user address.

The server 108 manages the area numbers of the areas of the radio base stations 102 by associating them with the area addresses set in the destination address 301 of a message transmitted from the information processing terminal 109 according to the position information management table 501. The relation between the area numbers and the area addresses in this table is arranged on an n-to-n correspondence, where n=1 or more. However, this relation may be arranged such that one area address is related to a plurality of areas.

The server 108 manages, as to the respective area numbers of the areas of the respective radio base stations, the user addresses which determine the PHS terminals 101 in the area specified by the area number, using the position information management table 501. Note that since the user addresses are related to the PHS terminals 101 on a one-to-one correspondence, the PHS numbers are used as the user addresses.

The server 108 updates the user address field 504 according to position information of the PHS terminal 101 obtained from the switching equipment 103 by the position information obtaining unit 1081 as described later.

FIG. 10 is a sequence diagram showing the server 108 obtaining position information of a radiotelephone (PHS) terminal 101 from the switching equipment 103.

Figure 10A:
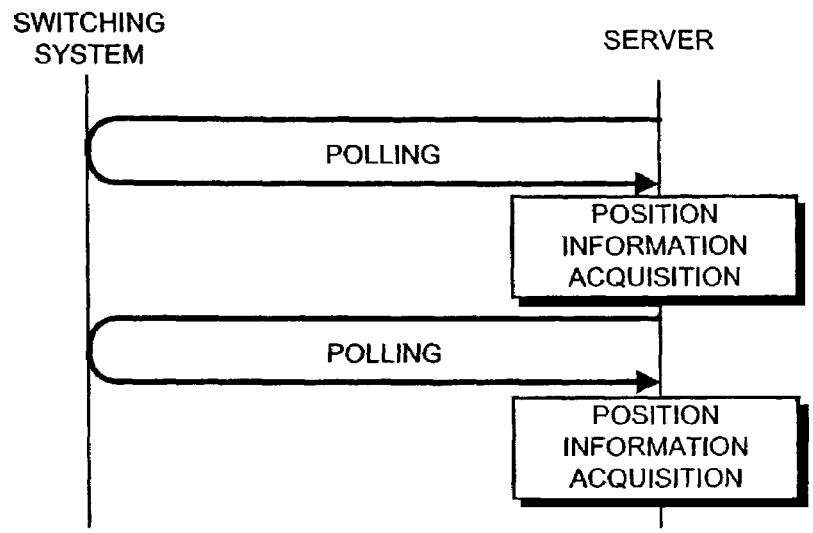
FIGS. 10A and 10B are sequence diagrams when the server obtains position information in the first embodiment of the present invention.

FIG. 10A shows a process that position information managed by the switching equipment 103 is obtained by the server 108 periodically accessing (by polling) the switching equipment 103.

The server 108 obtains position information managed by the switching equipment 103 by its position information obtaining unit 1081 accessing (by polling) the switching equipment 103 and compares the obtained position information with the position information that the server 108 itself possesses. If there is any change, the server 108 updates the user address field 504 in the position information management table 501.

Figure 10B:
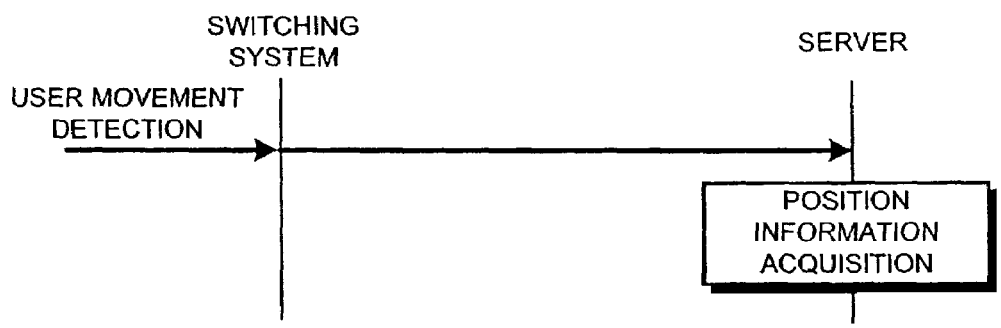

FIG. 10B shows a process that the switching equipment 103, when it detects a position movement of a PHS terminal 101, notifies this to the server 108. The switching equipment 103 manages the updating condition of the position information management table 401 by its position information managing unit 1031, and if there is any update, transmits updated position information to the server 108. In response, the server 108, on receiving the notification from the switching equipment 103 at its position information obtaining unit 1081, updates the user address field 504 in the position information management table 501.

Description will next be given of the message transmission process of the server 108.

As described above, the server 108 is configured as an information processing device including a CPU 701, a memory 702, a secondary memory 703, a switching equipment interface 704, and LAN interface 705 as shown in FIG. 11. The CPU 701, which loads a program stored in the secondary memory 703 and executes the program on the memory 702, realizes the message transmission process described below.

Description will now be made of a case, taken as an example, where only an area address (a condition of space) is entered in the destination address 301 of a message transmitted from the information processing terminal 109. It is when a message from the information processing terminal 109 arrives at the server 108 that the server 108 transmits the message which is transmitted from the information processing terminal 109 to the radiotelephone terminal 101.

FIG. 12 is a flowchart of the message transmission process by the server 108.

Figure 12B:
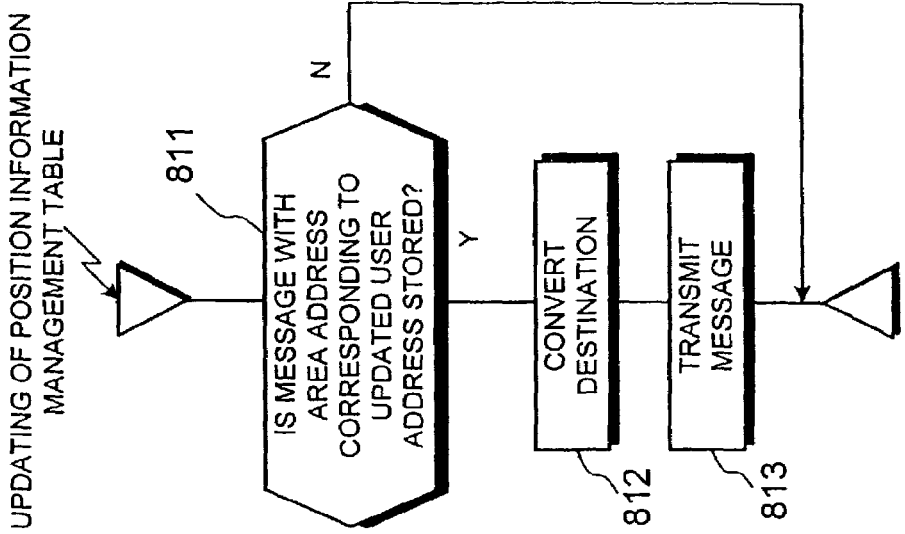
FIGS. 12A and 12B are flowcharts of the message transmitting process by the server in the first embodiment of the present invention.
Figure 12A:
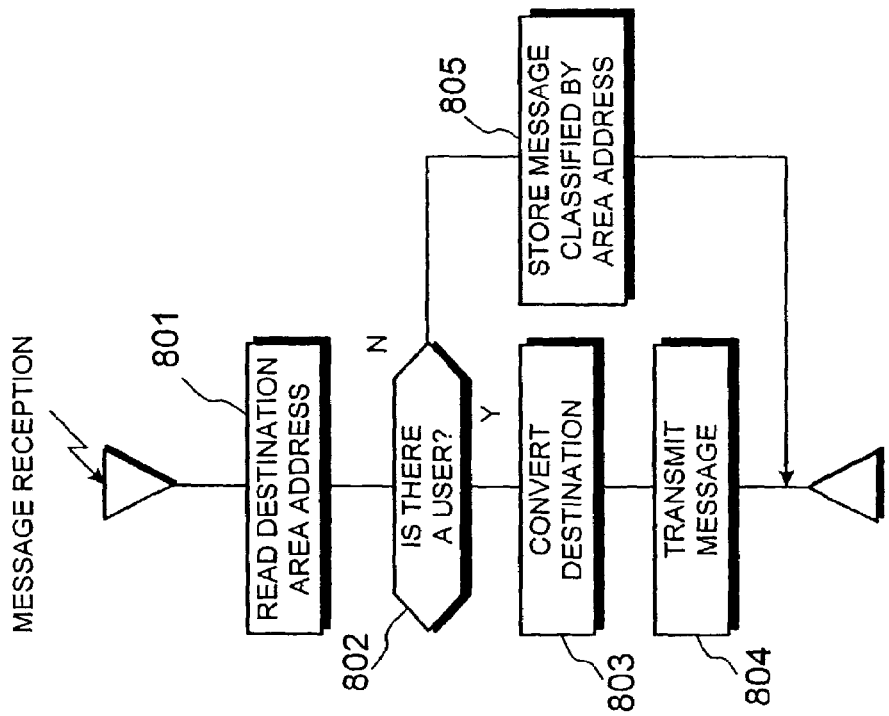

In FIG. 2, when the server 108 receives a message from the information processing terminal 109 through LAN 106 at its message receiving unit 1083, the radiotelephone terminal determining unit 1084 reads an area address in the destination address 301 of the message (step 801) as shown in FIG. 12A, and checks the user address field 504, which corresponds to the area address read at step 801, in the position information management table 501 stored in the position information management table memory 1082. The server 108 then checks whether or not there is a user in the area with that area address (step 802).

If there is a user in the area of that area address (step 802), the radiotelephone terminal determining unit 1084 sets the user address in the destination address 301 (step 803) in place of the area address read at step 801. The server 108 transmits the message from the message transmitting unit 1087 (step 804). When there are a plurality of users in the same area, the radiotelephone terminal determining unit 1084 selects one user. For this selection of a user, no method is defined.

On the other hand, if there is no user in the area of that area address (step 802), the radiotelephone terminal determining unit 1084 stores the message in the untransmitted message memory 1090 (step 805). Messages are stored classified by area addresses.

When the user address field 504 in the position information management table 501 has been updated according to the position information obtained by the position information obtaining unit 1081 by a method shown in FIG. 10A or FIG. 10B, the radiotelephone terminal determining unit 1084 checks, as shown in FIG. 12B, if a message with an area address, which corresponds to the updated user address, entered in the destination address 301, is stored in the untransmitted message memory 1090 (step 811).

When such a message is stored (step 811), the radiotelephone terminal determining unit 1084 sets the updated user address in the destination address 301 in place of the area address previously set in the address 301 of the message (step 812), and then the server 108 transmits the message from the message transmitting unit 1087 (step 813).

By this arrangement, when it occurs that there is a user in the area represented by the area address set in the destination address 301 of a message among the messages stored at step 805 in FIG. 12A, the server 108 transmits the message to the switching equipment 103.

A message transmitted from the server 108 to the switching equipment 103 is transmitted to a PHS terminal 101 with a user address (PHS number) set in the destination address 301 of the message by an incoming message process by the switching equipment 103, which is a well-known technique, and then transmitted to the information processing terminal 105 connected to the PHS terminal 101.

Figure 13A:
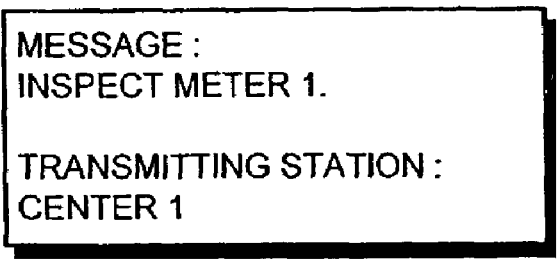
FIGS. 13A, 13B and 13C are explanatory diagrams showing examples of screen displays of the information processing terminal on the message receiving side in the first embodiment of the present invention.

The information processing terminal 105 shows the received message on its display. An example of screen display is shown in FIG. 13A. In the example of FIG. 13A, the contents of a message (data portion 303 of the message) and the message-transmission source user address (transmission source user address 302 of the message) are shown on the display.

Figure 14A:
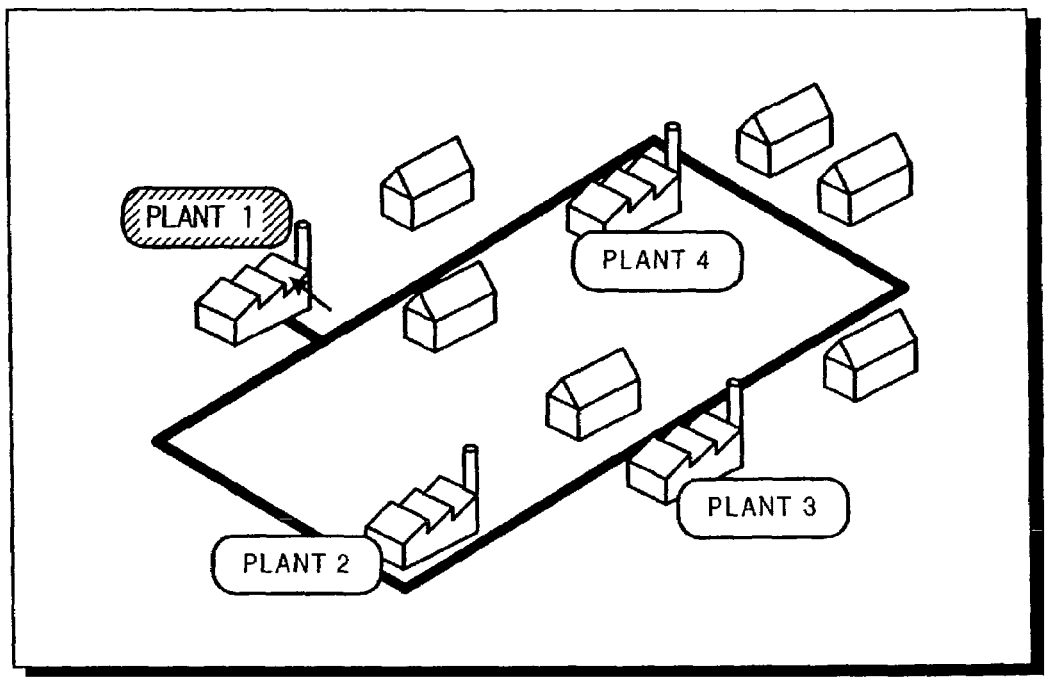
FIGS. 14A and 14B are explanatory diagrams each showing an example of screen image of the information processing terminal on the message transmitting side in the first embodiment of the present invention.

The screen display on the message transmitting side will be described together with the explanation of the screen display of the massage receiving side. The user interface 1091 in the information processing terminal 109 at the message transmission source may be to any specification so long as it can transmit a message with an area address entered in the address 301. For example, as shown in FIG. 14A, when a message generating editor, which runs on the information processing terminal 109, shows a map of a message transmission area on the display and the user at the information processing terminal 109 specifies a desired place on the map, the interface 1091 may be arranged to set an area address, which corresponds to the specified place, into the destination address.

Figure 14B:
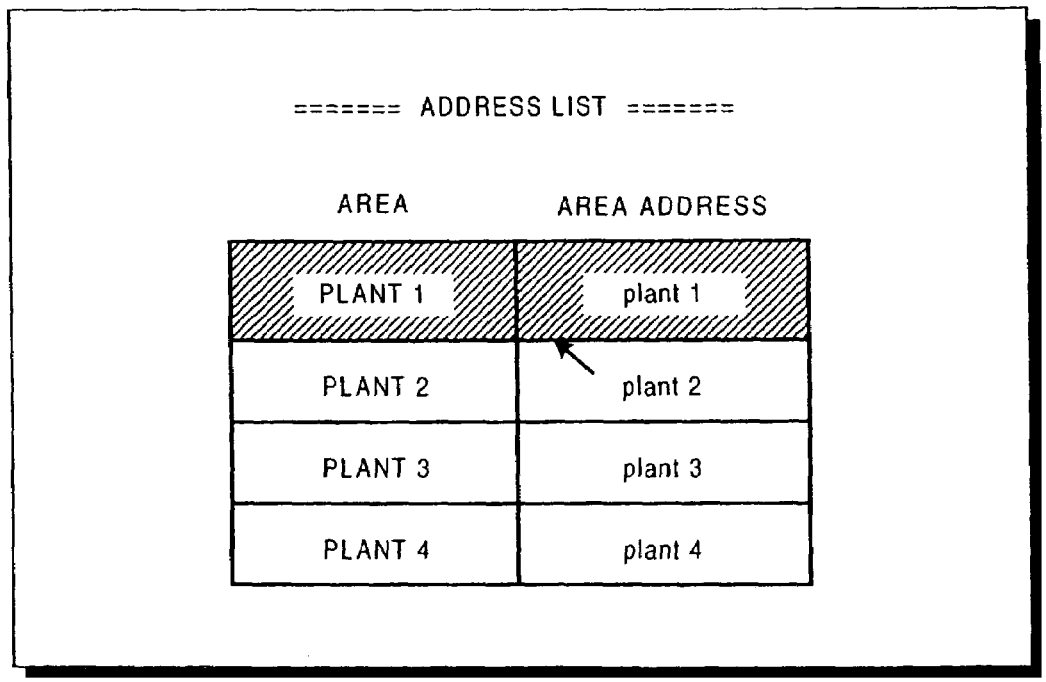

Moreover, for example, as shown in FIG. 14B, it may be arranged that the message generating editor, which runs on the information processing terminal 109, shows on the display an address list which relates the actual area information (plant numbers, for example) to the area addresses, and the server 108 sets an area address, which corresponds to the item specified by the user at the information processing terminal 109, in the address 301. As has been described, according to the first embodiment of the present invention, the user at the message transmission source can transmit a message by merely specifying a condition of space (or conditions of space and time) to an unspecified user who meets the condition or conditions without knowing the location or the address of a user moving from place to place. Therefore, a user on the move can receive a message, which is appropriate to the place (or the place and time).

For example, when the first embodiment is applied to a plant operation monitoring system, it becomes possible for the responsible person for maintenance to transmit an investigation instruction message or a message notifying the occurrence of abnormality to a maintenance person in the area where a measuring meter at issue is located, without managing the location of plant maintenance persons in the field. The plant maintenance person on the message receiving side has only to work in the area where he is at the moment and need not make a wasteful movement to a distant place.

For example, an information supplier, if he specifies an area corresponding to the station yard, can send a message notifying departure or arrival time of a train or some other liaison message to a user, who is present in the station yard. In a place of some event, if a supplier of information transmits a message by specifying an area corresponding to the place of event, he can send guidance of the event to the users, who are present in the event site. Moreover, a restaurant manager can transmit the contents of the menu to the users, who are in the vicinity of the restaurant by limiting the transmission range to the area corresponding to the neighborhood of the restaurant.

As has been discussed, according to the first embodiment of the present invention, it becomes possible to support various forms of communication.

In the first embodiment mentioned above, the message transmission process of the server 108 has been described with reference to a case where only an area address (a condition of space) is set in the address 301 of a message transmitted from the information processing terminal 109. However, when it is arranged that transmission waiting time or specified transmission time (a condition of time) is additionally set, it is possible that the server 108 temporarily stores the message received from the information processing terminal 109 in the untransmitted message memory 1090, and when the transmission waiting time has elapsed or when specified transmission time comes, the same message transmission process as that described above is performed.

Some applied cases of the first embodiment will be described in the following.

APPLIED EXAMPLE 1

In the first embodiment, if the server 108 manages the messages received from the information processing terminal 109, the user address of the information processing terminal 109 of the transmission source of the message and the user addresses of the PHS terminals 101 of the transmission destination of the message by associating them, it becomes possible for the recipient of the message to transmit a reply message without knowing the user address of the transmission source of the message he received.

A case according to the above arrangement will be described.

Figures 15, 16:
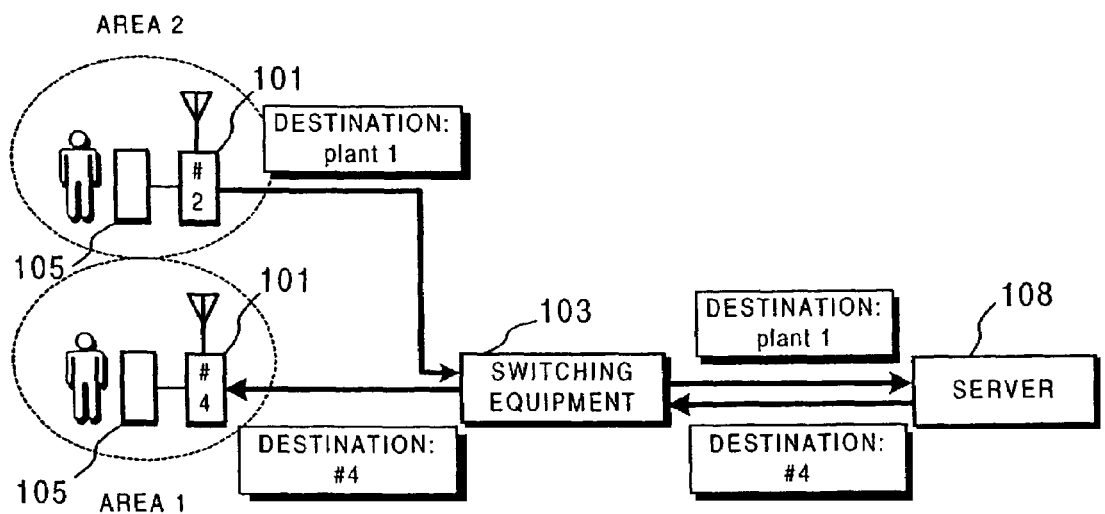
FIG. 15 is an explanatory diagram showing the constitution of the transmission source management table managed by the server in Applied example 1 of the first embodiment of the present invention.
FIG. 16 is a conceptual diagram showing the flow of messages in Applied example 2 of the first embodiment of the present invention.

FIG. 15 is an explanatory diagram showing the constitution of the transmission source management table stored in the transmission source management table memory 1085, which the server 108 uses in managing the message transmission sources.

As shown in FIG. 15, the entries of the transmission source management table 1101 stored in the transmission source management table memory 1085 include a field 1102 in which a message ID that the server 108 assigned uniquely to a message is stored, a field 1103 in which a user address of the information processing terminal 109 at the transmission source is stored, and a field 1104 for a user address (PHS number) of the PHS terminal 101 at the transmission destination is stored.

The destination and transmission source managing unit 1085 shown in FIG. 2, when receiving a message from the radiotelephone terminal determining unit 1084, assigns a message ID to the message, and registers this message ID and the user address of the information processing terminal 109 at the transmission source respectively into the message ID field 1102 and the receiving station user address field 1103. The destination and transmission source managing unit 1085 registers the user address (PHS number), set in the address 301 of the message, into the destination user address field 1104, which corresponds to the message ID.

Description will then be given of how a reply message is sent from the user of the radiotelephone (PHS) terminal 101 and the information processing terminal 105, the recipient of the message.

The user of the PHS terminal 101 and the information processing terminal 105, on receiving a message, generates a reply message to respond to the message, and inputs a reply message transmit instruction.

Figure 13B:
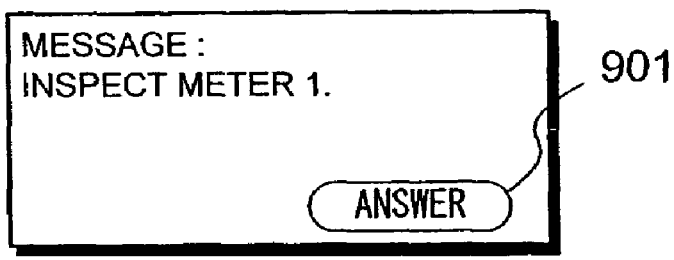

This first applied example is intended to make it possible to transmit a reply message without knowing the user address of the information processing terminal 109 as the transmission source of the message. Therefore, the screen display of a message at the radiotelephone terminal 105 needs to show the contents of the message (the data portion 303) and a reply button 901 as indicated in FIG. 13B.

The user of the PHS terminal 101 and the information processing terminal 105, after generating a reply message, presses the reply button to instruct to transmit a reply message to the information processing terminal 109 at the transmission source of the message.

Figure 13C:
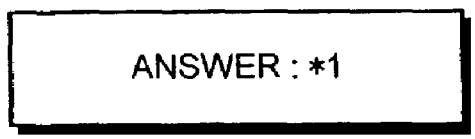

With regard to the reply button 901, instead of using the information processing terminal 105, it may be arranged that on the display of the PHS terminal 101, a specific number (*1 for example) is displayed, which offers the same effect as in pressing the reply button 901 as shown in FIG. 13C. With this arrangement, the user of the PHS terminal 101 and the information processing terminal 105 may make a notification mentioned above by pressing the displayed number.

Meanwhile, when the reply button 901 is pressed, the information processing terminal 105 transmits the generated reply message from the PHS terminal 101 through the switching equipment 103 to the server 108. At this time, the under-communication state, created by transmission of the message, has been maintained between the PHS terminal 101 and the server 108.

When receiving the reply message from the reply message receiving unit 1088 shown in FIG. 2, the server 108 checks the transmission source user address field 1103, which corresponds to the destination user address field 1104 where there has been the user address same as that of the PHS terminal 101 at the transmission source of the reply message. The reply message transmitting unit 1089 transmits the received reply message to the information processing terminal 109 of the transmission source user address stored in the transmission source user address field 1103.

Incidentally, when the reply message transmitting unit 1089 has transmitted the reply message, the destination and transmission source managing unit 1085 clears the related entries in the transmission source management table 1101.

As has been explained, according to this applied example, the server 108 manages the messages received from the information processing terminals 109 by associating them with the user addresses of the information processing terminals 109 of the transmission source, and also with the user addresses of the PHS terminals 101 at the message transmission destination. Therefore, the recipient of a message can transmit a reply message without knowing the user address of the transmission source of the message.

According to this applied example, it may be arranged that when the server 108 is going to transmit a message in a message transmitting process, if there is not any user in the area at an area address set in the address 301 of the message, or if there is still not any user in the area when a predetermined time limit has passed, the server 108 can return the message to the information processing terminal 109 at the transmission source, and clear the related entries in the transmission source management table 1101.

APPLIED EXAMPLE 2

In the first embodiment, description has been made on the assumption that the user at the message transmission source is a user at the information processing terminal 109. However, the user at the transmission source may be a user moving from place to place (a user at the PHS terminal 101 and an information processing terminal 105). The user on the move can send a message only by specifying a condition of space (or conditions of space and time) to an unspecified user who meets the condition or conditions without knowing the location or the address of the unspecified user.

FIG. 16 is a conceptual diagram showing the flow of messages in this second applied example.

As shown in FIG. 16, in this second applied example, a message sent from the information processing terminal 105 connected to a PHS terminal 101 located in "area 2", for example, is transmitted through the switching equipment 103 to the server 108, and the server 108 in turn transmits the message through the switching equipment 103 to the information processing terminal 105 connected to a PHS terminal 101 located in "area 1".

At this time, the server 108 may handle the message sent from the information processing terminal 105 just like a message sent from the information processing terminal 109.

APPLIED EXAMPLE 3

In the first embodiment, when there are plurality of users in the same area at step 802 of FIG. 12A, the server 108 selects one user and sends a message to him or her. However, the server 108 may broadcasts the message to all users located in the same area without selecting one user. Here, it may be arranged that the user at the message transmission source can request that a message be broadcast, and the radiotelephone terminal determining unit 1084 in the server 108 makes a decision whether or not to select one user depending on the presence or absence of a broadcast transmission request.

Figure 17:
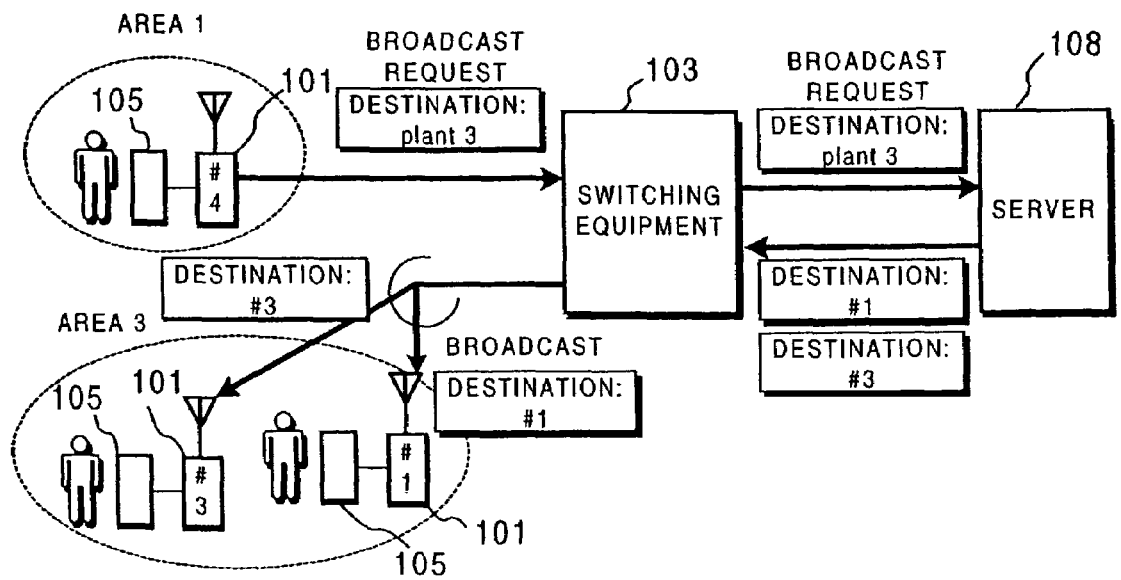
FIG. 17 is a conceptual diagram showing the flow of messages in Applied example 3 of the first embodiment of the present invention.

FIG. 17 is a conceptual diagram showing the flow of messages in the third applied example.

As shown in FIG. 17, in this third applied example, a message sent from the information processing terminal 105 connected to a PHS terminal 101 located in "area 1'" is transmitted through the switching equipment 103 to the server 108, and the server 108 in turn transmits the message to the information processing terminals 105 connected to all PHS terminals 101 located in "area 3" through the switching equipment 103.

It is also possible to make an arrangement that the user at the message transmission source can specify repetition periods or a number of times of broadcast when making a broadcast transmission request, the radiotelephone terminal determining unit 1084 of the server 108 stores a message with specified periods or number of times in the untransmitted message memory 1090, and the server 108 broadcasts the message to all users located in the area at the time of transmission according to the specified periods and number of times. And, after the message has been transmitted a specified number of times, the message may be erased from the untransmitted message memory 1090. If there is movement of a user while broadcast transmission is repeated, the position information obtaining unit 1081 updates the position information management table 501 stored in the position information management table memory 1082, and broadcasts the message based on updated position information.

According to this third applied example, the user at the message transmission source can broadcast an emergency message or the like to all users as the situation requires, by which real time communication can be carried out.

APPLIED EXAMPLE 4

In the first embodiment, if the user at the message transmission source can make a broadcast transmission request like in the third applied example, with regard to a message sent from the information processing terminal 105 connected to a PHS terminal 101, if no area address is set in the address 301 of the message or if a predetermined specific area address (* for example) is set in the address 301, in other words, if the message is a special message, the radiotelephone terminal determining unit 1084 determines the area where there are some users at the message receiving stations and lets all the users in the determined area be the destinations.

Figure 18:
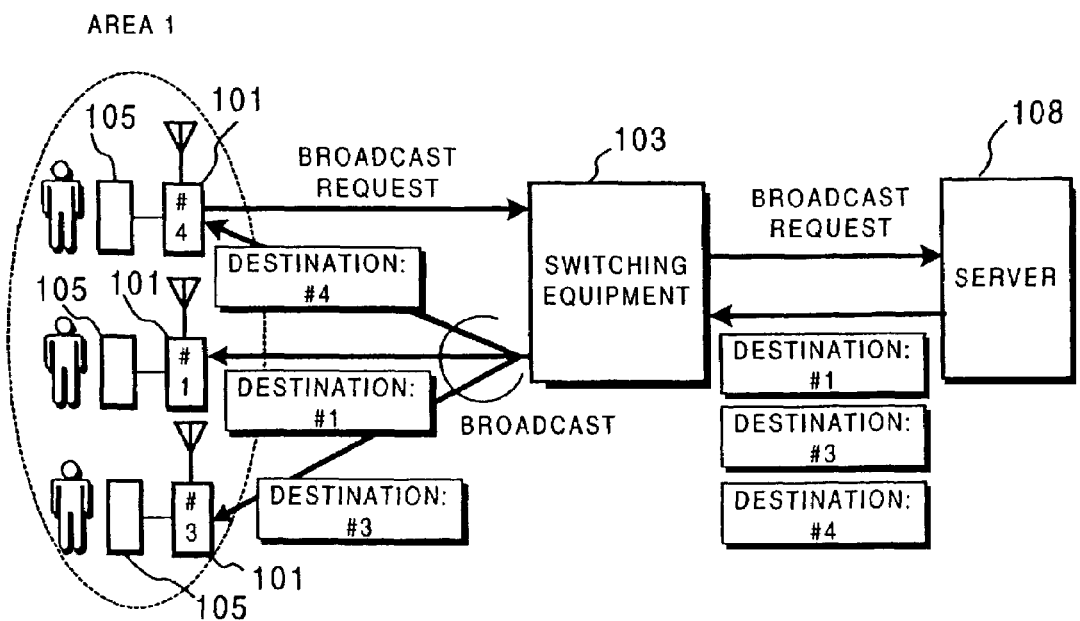
FIG. 18 is a conceptual diagram showing the flow of messages in Applied example 4 of the first embodiment of the present invention.

FIG. 18 is a conceptual diagram showing the flow of messages in this fourth applied example.

As shown in FIG. 18, in this fourth applied example, for example, a message sent from the information processing terminal 105 connected to a PHS terminal located in "area 1" is transmitted through the switching equipment 103 to the server 108, and the server 108 in turn transmits the message through the switching equipment 103 to the information processing terminals 105 connected to all PHS terminals 101 located in "area 1".

For example, in a case where this example is applied to a plant monitoring system, if an arrangement is made that when an emergency message, which has no area address set in the address 301 or which has a specific area address set previously, is transmitted to the server 108 when an emergency button previously provided on the information processing terminal 105 is pressed, then should abnormality, such as an accident, occur, a plant maintenance person in the field can press the emergency button, by which the emergency message is broadcast to other maintenance persons in the same area to call for their assistance.

APPLIED EXAMPLE 5

In the first embodiment, if the user at the message transmission source can make a broadcast transmission request like in the third applied example, and if the user at the message transmission source can further specify the number of users to whom a message is to be broadcast, the radiotelephone terminal determining unit 1084 of the server 108 can specify as message recipients the number of users out of all users located in the area specified as the destination of the message. For this reason, the message can be sent to the specified number of users.

In the above case, if it was impossible to broadcast the message to the specified number of users in step 802 of FIG. 12A, the radiotelephone terminal determining unit 1084 of the server 108 temporarily stores the message in the untransmitted message memory 1090 and manages the user numbers to which the message was transmitted. Each time the position information management table 401 is updated, the radiotelephone terminal determining unit 1084 checks if there is any user who is in the area specified as the destination of the message but to whom that message has not been transmitted, and if there is any user who has not received that message, sends the message to the user as the destination. This process is repeated until the number of users who received the message amounts to the number of specified users. When the users who received the message have reached the number of specified users, the message is erased from the untransmitted message memory 1090.

Second Embodiment

Next a second embodiment of the present invention will be described.

The second embodiment of the present invention differs from the first embodiment in the way in which the recipient of a message sends a reply message. More specifically, in the second embodiment, the recipient of a message responds by a voice message from a PHS terminal 101 to the telephone terminal 110 of the sender of the preceding message. Only the differences from the first embodiment will be described in the following.

In the second embodiment, the information processing terminal 105 and the radiotelephone (PHS) terminal 101 are not provided in a unified device, but need to be separate devices.

Figure 19:
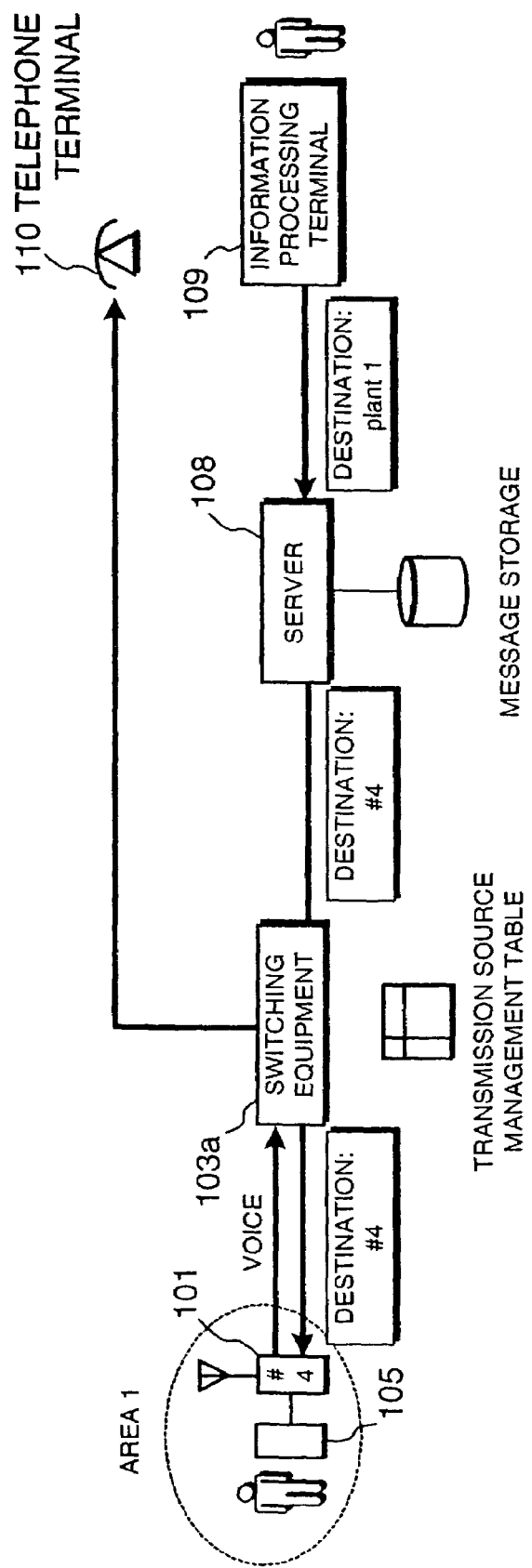
FIG. 19 is a conceptual diagram showing the flow of messages in a second embodiment of the present invention.

FIG. 19 is a conceptual diagram showing the flow of messages in the second embodiment.

As shown in FIG. 19, in the second embodiment, a message sent from the information processing terminal 109, as in the first embodiment, is transmitted by the server 108 through a switching equipment 103a to the information processing terminal 105 connected to a PHS terminal 101. A reply message (voice message) from the PHS terminal 101 in response to the initial message is transmitted through the switching equipment 103a and a telephone network 107 to the telephone terminal 110, which is used by the user of the information processing terminal 109.

FIG. 20 is an explanatory diagram showing the format of a message sent from the information processing terminal 109.

As shown in FIG. 20, in addition to the destination 301, the transmission source user address 302, and the data portion 303, a message sent from the information processing terminal 109 further contains a transmission source telephone number 304, namely, the telephone number of the telephone terminal 110 which is used by the user at the information processing terminal 109. The destination, the transmission source user address and the transmission source telephone number can be set by the user through the user interface 1091 shown in FIG. 3.

FIG. 21 is a functional block diagram of the switching equipment 103a shown in FIG. 19.

The difference of the switching equipment 103a in FIG. 21 from the switching equipment 103 shown in FIG. 4 is the additional provision of a destination and transmission source managing unit 1037 and a transmission source management table 1038. The destination and transmission source managing unit 1037 relates the destination of a message from server 108, received by the data receiving unit 1033, to the transmission source telephone number in the message when the above-mentioned managing unit 1037 registers the destination of the message into the transmission source management table stored in the transmission source management table memory 1038. The switching equipment 103*a*, which received a return (voice) message through the data receiving unit 1035, controls the data transmitting unit 1036 to send the message to the transmission source telephone number of the initial message, determined by the transmission source management table in the transmission source management table memory 1038.

In the second embodiment, because the voice message sent as a reply from the recipient of the initial message does not pass through the server 108, the switching equipment 103*a* needs to manage the transmission source telephone number Therefore, description will now be made of how the transmission source telephone numbers are managed.

FIG. 22 is an explanatory diagram showing the constitution of the transmission source management table stored in the transmission source management table memory 1038, which is used by the switching table 103*a* for managing the transmission source telephone numbers.

As shown in FIG. 22, each of entries of the transmission source management table 1701 consists of a 20 field 1702 for storing a PHS number of the transmission destination of a message and a field 1703 for storing a transmission source telephone number.

The destination and transmission source managing unit 1037 manages the telephone numbers of the telephone terminals 110, used by the user at the information processing terminal 109 at the message transmission source, for every PHS number of the PHS terminals 101 at the message transmission destination. More specifically, the destination and transmission source managing unit 1037, when transmitting a message from the server 108 to a PHS terminal 101, reads the telephone number set in the transmission source telephone number 304 in the message, and registers the telephone number in the transmission source telephone number field 1703, which corresponds to the PHS number of the PHS terminal 101 at the message transmission destination.

The user of the PHS terminal 101 and the information processing terminal 105, when receiving a message, notifies to the telephone terminal 110 used by the user of the information processing terminal 109 at the message transmission source that he or she is going to send a reply message (voice message).

The second embodiment is intended to make it possible to respond by a voice message without knowing the telephone number of the telephone terminal 110 used by the user of the information processing terminal 109 at the message transmission source. Therefore, the screen display of a message at the information processing terminal 105 may be as shown in FIG. 13B for example.

When the reply button 901 is pressed, the information processing terminal 105 sends a notification of reply message transmission through the PHS terminal 101 to the switching equipment 103. Note that at this time the under-communication state created by transmission of the message has been maintained between the PHS terminal 101 and the server 108.

On receiving a notification from the PHS terminal 101 through the data receiving unit 1035 that the terminal 101 is going to transmit a reply message, the switching equipment 103, through its destination and transmission source managing unit 1037, checks the transmission source telephone number field 1703, which corresponds to the PHS number field 1702 holding the same PHS number as the PHS number of the above-mentioned PHS terminal 101, in the transmission source management table 1701 stored in the transmission source management table memory 1038. By using the data transmitting unit 1036, the switching equipment 103 calls through the telephone network 107 the telephone terminal 110 of the telephone number stored in the transmission source telephone number field 1703. When receiving a reply from the telephone terminal 110 at the called side, the switching equipment 103, by using the destination and transmission source managing unit 1037, switches over from the speech channel with the server 108 to the speech channel with the telephone terminal 110, thus setting up an under-communication state between the PHS terminal 101 and the telephone terminal 110.

At the moment the under-communication state is created between the PHS terminal 101 and the telephone terminal 110 at the called side, the destination and transmission source managing unit 1037 clears the entries concerned in the transmission source management table 1701 stored in the transmission source management table memory 1038.

As has been described, according to the second embodiment, the recipient of a message can respond by a voice message without knowing the telephone number of the user's telephone terminal 110, which is used by the information processing terminal 109 at the message transmission source, so that it becomes possible to carry out communication in real time by voice.

Third Embodiment

Next, a third embodiment of the present invention will be described.

The difference of the third embodiment from the first embodiment is that it is made unnecessary for the server 108*a* to manage position information of PHS terminals 101. Only differences from the first embodiment will be described in the following.

FIG. 23 is a conceptual diagram showing the flow of a message in the third embodiment of the present invention.

As shown in FIG. 23, in the third embodiment, a message sent from the information processing terminal 109, like in the first embodiment, is transmitted by the server 108*a* through the switching equipment 103*b* to the information processing terminal 105 connected to a PHS terminal 101.

FIG. 24 is a functional block diagram of the server 108*a* shown in FIG. 23.

The differences of the server 108*a* in FIG. 24 from the server 108 in FIG. 2 are that a memory 1082*a* for an area address management table is installed in place of the position information management table memory 1082, and that a destination address obtaining unit 1081*a* is provided in place of the position information obtaining unit 1081.

The area address management table memory 1082*a* stores an area address management table 1091 in which the area addresses are related to the area numbers as shown in FIG. 25. The destination address obtaining unit 1081*a* transmits an area address, sent from the radiotelephone terminal determining unit 1084, to the switching equipment 103*b*, and notifies the address (destination address) of the radiotelephone terminal 101, received as a reply from the switching equipment 103*b*, to the radiotelephone terminal determining 1084.

Figure 26:
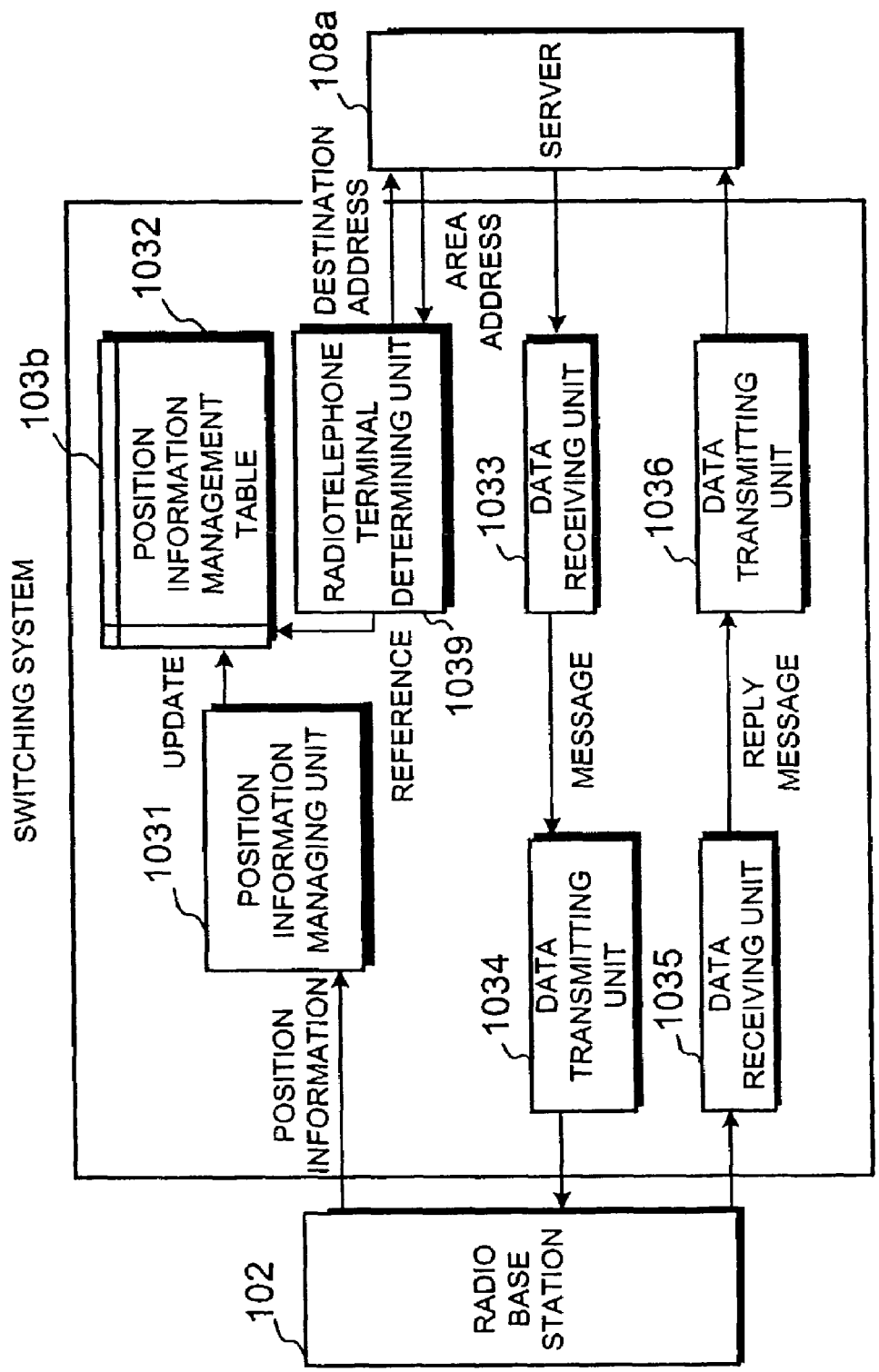
FIG. 26 is a functional block diagram of the switching equipment 103*a* shown in FIG. 23.

FIG. 26 is a functional block diagram of the switching equipment 103*b* shown in FIG. 23.

The difference of the switching equipment 103*b* in FIG. 26 from the switching equipment 103 in FIG. 4 is the additional provision of a radiotelephone terminal determining unit 1039. The radiotelephone terminal determining unit 1039 searches the position information management table 1032 for the address of the radiotelephone terminal 101 located at an area address notified from the server 108*a*, and transmits the retrieved address of the radiotelephone terminal 101 as the destination address to the server 108*a*.

In the third embodiment, the server 108*a* is made not to manage position information of the PHS terminal 101, so that the position information management table 1082*a* and the position information obtaining unit 1081 become unnecessary. For this reason, the switching equipment 103*b* sends information necessary for conversion of the destination 301 of the message to the server 108*a*.

FIG. 27 is a sequence diagram when the server 108*a* transmits a message.

Figure 27A:
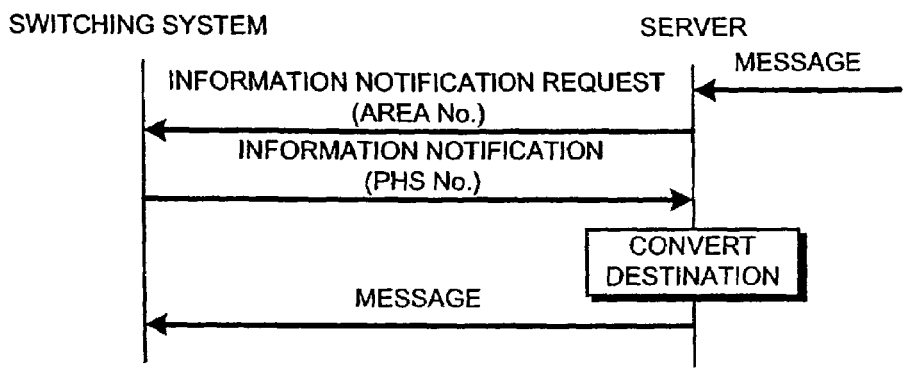
FIGS. 27A–27C are sequence diagrams when the server transmits a message in the third embodiment of the present invention.

FIG. 27A shows a process that when the server 108*a* receives a message, the server 108*a* requests the switching equipment 103*b* to transmit information.

In the server 108*a*, when the message receiving unit 1083 receives a message from the information processing terminal 109, the radiotelephone terminal determining unit 1084 refers to the area address management table 1901 in the area address management table memory 1082*a*, and determines an area number corresponding to the area address set in the address 301 in the received message. The server 108*a* notifies the determined area number to the switching equipment 103*b* through the destination address obtaining unit 1801*a*.

In response, the switching equipment 103*b*, by using the radiotelephone terminal determining unit 1039, refers to the position information management table 401 stored in the position information management table memory 103 and obtains the PHS number of the radiotelephone (PHS) terminal 101 located in the area indicated by the notified area number The switching equipment 103*b* notifies the obtained PHS number as the destination address to the server 108*a*.

When the destination address obtaining unit 1081*a* receives the PHS number from the switching equipment 103*b*, the server 108 notifies the PHS number to the radiotelephone terminal determining unit 1084. In response, the radiotelephone terminal determining unit 1084 converts the destination address 301 of the message to the notified PHS number, and the server 108*a* transmits the PHS number to the switching equipment 103*b* through the message transmitting unit 1087.

Figure 27B:
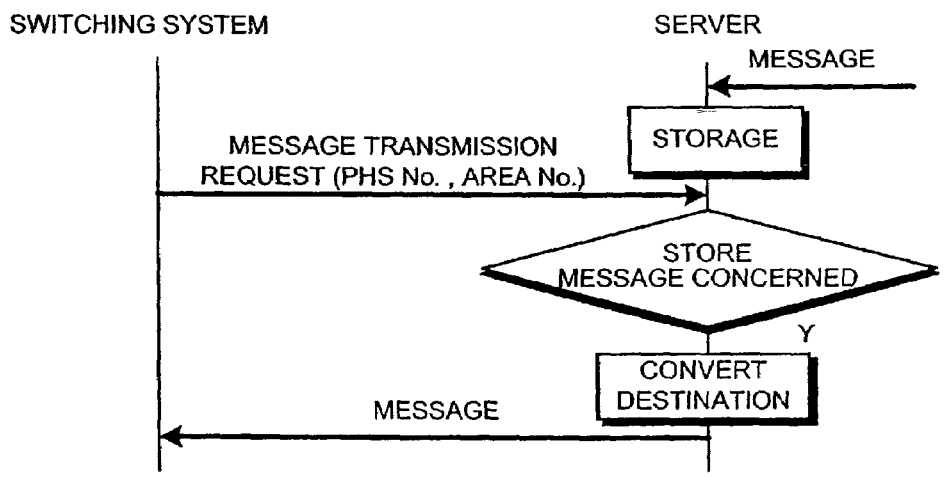

FIG. 27B shows a process that the server 108*a* stores a message and then the switching equipment 103*b* requests the server 108*a* to transmit the message.

When receiving a message from the information processing terminal 109, the server 108*a* does not transmit the message immediately, but stores the message in the untransmitted message memory 1090 after sorting in its corresponding area address, which is set in the address 301 of the message.

On the other hand, the switching equipment 103*b*, by using the radiotelephone terminal determining unit 1039, periodically refers to the position information management table 401 stored in the position information management table memory 1032, and designates an area number, and notifies the area number and a PHS number of the PHS terminal in the area determined by the area number to the server 108*a*, thereby requests the server 108*a* to transmit a relevant message. In designating the area number, the area numbers stored in the position information management table 401 may be designated in a sequential order. Or, the area numbers from which the area number designated last time (not necessarily limited to one area number) has been excluded from the position information management table 401 may be designated.

The server 108*a*, when receiving a notification of an area number, which is designated by the switching equipment 103*b*, and a PHS number corresponding to the area number, notifies the area number and the corresponding PHS number to the radiotelephone terminal determining unit 1084. In response, the radiotelephone terminal, determining unit 1084 refers to the area address management table 1901 stored in the area address management table memory 1082*a* to see if any message, in which the area address corresponding to the specified area number is set in the destination address 301, is stored in the untransmitted message memory 1090. If this message is stored, the radiotelephone terminal determining unit 1084 converts the address in the message to the specified PHS number, and the server 108*a* transmits the message to the switching equipment 103*b* through the message transmitting unit 1087.

Figure 27C:
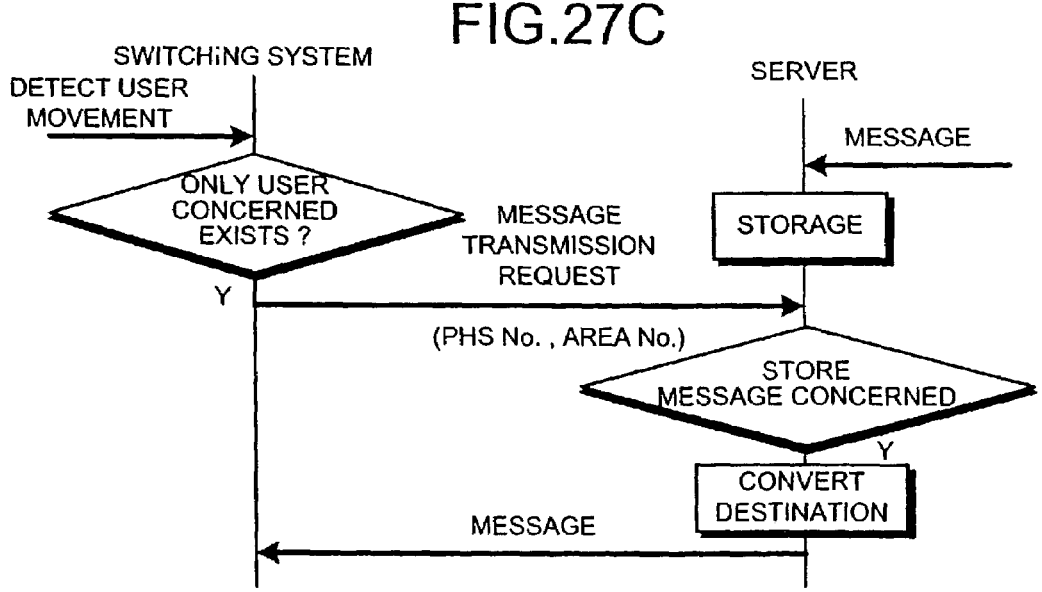

FIG. 27C shows a process that when the movement of a PHS terminal 101 is detected, the switching equipment 103*b* requests the server 108*a* to transmit a message. When receiving a message from the information processing terminal 109, the server 108*a* does not transmit the message but stores in the untransmitted message memory 1090 in its corresponding area address, which is set in the destination address 301 of the message.

On the other hand, in the switching equipment 103*b*, when the position information management table 401 in the position information management table memory 1032 has been updated by its radiotelephone terminal determining unit 1039, in other words, when the PHS terminal 101 has moved from one area to another, suppose that there is none other than the PHS terminal 101 in the area to which the PHS terminal 101 moved. More specifically, when only one PHS number registered in the area address at which one PHS number is added, the switching equipment 103*b* designates the area number at that area address, and notifies the area number and one PHS number registered related to the area number to the server 108*a*, and thereby requests the server 108*a* to transmit a message.

When receiving the designated area number and the PHS number related to the area number from the switching equipment 103*b* through the destination address obtaining means 1081*a*, the server 108*a* notifies the area number and the corresponding PHS number to the radiotelephone terminal determining unit 1084. In response, the radiotelephone terminal determining unit 1084 refers to the area address management table 1091 stored in the area address management table memory 1082*a* to check if a message, for which an area address corresponding to the designated area number is set in the address 301 of the message, is stored in the untransmitted message memory 1090. If such a message is stored, the server 108*a* converts the address 301 of the message to the designated PHS number, and transmits the message to the switching equipment 103*b* through the message transmitting unit 1087.

As has been described, according to the third embodiment, even though the server 108*a* does not manage position information of PHS terminals 101, the same effects as in the first embodiment can be obtained. In other words, the user at a message transmission source can transmit a message only by specifying a condition of space (or conditions of space and time) to an unspecified user who meets the condition or conditions without knowing the location or the address of the user moving from one area to another. Therefore, it is possible for a user moving from one place to another to receive a message that is appropriate to the place (the place and time).

In the third embodiment, communication between the switching equipment 103b and the server 108a can be improved all the more because the server 108a need not manage position information about PHS terminals 101. Therefore, the third embodiment is effective when it is applied to private exchanges for limited ranges, not to the switching equipment 103b in an existing mobile telephone network 104.

Description will be made of some applied examples of the third embodiments.

APPLIED EXAMPLE 1

In the foregoing description of the third embodiment, the user at the message transmission source was supposed to be a user at the information processing terminal 109, but may be a user at a telephone terminal 110 or at a PHS terminal 101.

The user at a telephone terminal 110 or a PHS terminal 101 can generate a message to transmit by a combination of numeric buttons as with a radio paging portable receiver. In this case, the address 301 of a message is a telephone number, and a message does not pass through the server 108a, so that the address 301 needs to undergo conversion by the switching equipment 103b.

More specifically, in this first applied example, if a specific telephone number to be set in the address 301 has been related to an area address in advance in a telephone terminal 110 or a PHS terminal 101. When the user at the telephone terminal 110 or the PHS terminal 101 designates an area address on a message, the message with the corresponding telephone number set in the address 301 is transmitted to the switching equipment 103b.

Figure 28:
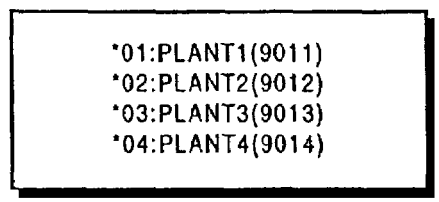
FIG. 28 is an explanatory diagram showing an example of screen display of a telephone terminal or a PHS terminal in Applied example 1 of the third embodiment of the present invention.

Here, an applied example of the user interface at a telephone terminal 110 or a PHS terminal 101 will be described briefly. For example, as shown in FIG. 28, if a table showing correspondence among information representing the actual areas (plant numbers for example), the area addresses and particular telephone numbers is presented on the display and the user at a telephone terminal 110 or a PHS terminal 101 selects a desired item on the table, the telephone number corresponding to the selected item can be set in the address 301 on a message.

On the other hand, the switching equipment 103b has the telephone numbers to be set in the address 301 and the area numbers associated with each other and receives a message from a telephone terminal 110 or PHS terminal 101, the switching equipment 103b determines the user (PHS terminal 101) located in the area represented by the area number corresponding to the telephone number set in the address 301, and transmits the message to the determined PHS terminal 101.

Figure 29:
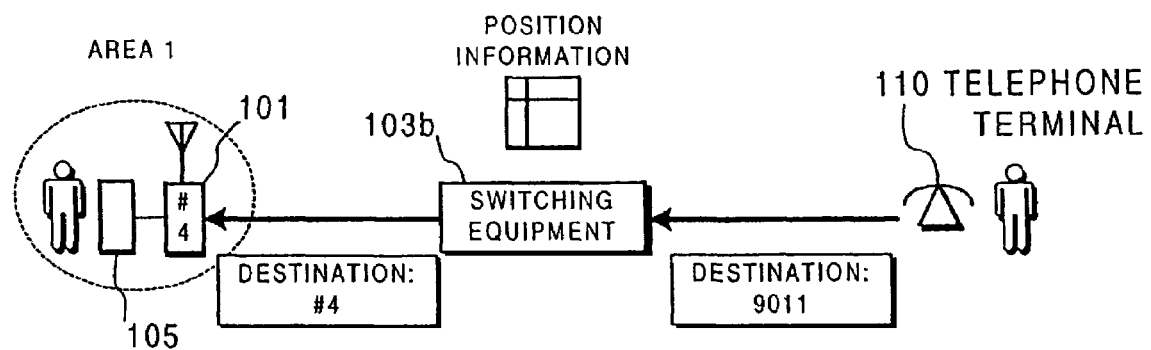
FIG. 29 is a conceptual diagram showing the flow of message in Applied example 1 of the third embodiment of the present invention.

FIG. 29 is a conceptual diagram showing the flow of a message in this first applied example.

As shown in FIG. 29, in this first applied example, a message sent from the telephone terminal 110 is transmitted by the switching equipment 103b to the information processing terminal 105 connected to the PHS terminal 101 located in "area 1".

APPLIED EXAMPLE 2

In the third embodiment, like in the first embodiment, when there are a plurality of users in the same area, the switching equipment 103b may be adapted to select one user when he or she transmits, or like in the third applied example of the first embodiment, the switching equipment 103b may be adapted not to select one user, but broadcast the message to all users located in the same area.

It may be arranged that the user at the message transmission source can make a request for message broadcast and that the switching equipment 103b can make a decision whether to select one user depending on whether there is an outstanding broadcast request or not.

In the second applied example, like in the first applied example, if the user at the message transmission source is a user at a telephone terminal 110 or a PHS terminal 101, the user at the transmission source may make a request for voice message broadcast.

As has been described, according to the present invention, the message sender can transmit a message only by specifying a condition of space (or conditions of space and time) to an unspecified user who meets the condition or conditions without specifying the recipient of the message. Therefore, a user moving from place to place can receive a message that is appropriate to the place (or the place and time).

Thus, it become possible to carry out communication between users most suitable in terms of space (or in terms of space and time).

What is claimed is:

1. A message transmission system in which a message transmission apparatus transmits a message created by a message creating apparatus to an apparatus having radio communication means, wherein said message creating apparatus comprises:
means for creating a transmission message having an area address which indicates an area as a destination, and
means for transmitting said transmission message to said message transmission apparatus, and wherein said message transmission apparatus executes:
means for receiving said transmission message,
storage means for storing said transmission message thus received,
means for waiting for an arrival of said apparatus having said radio communication means in an area indicated by said area address which is set in said transmission message as a destination,
means for obtaining a user address of said apparatus having said radio communication means thus arrived, and
means a process for transmitting said transmission message having said user address thus obtained as a destination.

2. A message transmission system in which a message transmission apparatus transmits a message created by a message creating apparatus to an apparatus having radio communication means, wherein said message creating apparatus comprises:
means for creating a transmission message having an area address which indicates an area as a destination, and
means for transmitting said transmission message to said message transmission apparatus, and wherein said message transmission apparatus comprises:
means for receiving said transmission message,
storage means for storing said received transmission message,
means for checking whether said apparatus having said radio communication means exists in an area indicated by said area address which is set in said transmission message as a destination,
means for waiting for an arrival of said apparatus having said radio communication means in said area, if said apparatus having said radio communication means does not exist in said area, and
means for transmitting said transmission message having a user address of said apparatus having said radio communication means as a destination if said apparatus having radio communication means exists in said area.

3. A message transmission system according to claim 1, wherein said message transmission apparatus manages said transmission message for each area address in said storage means.

4. A message transmission system according to claim 1, wherein said message transmission apparatus obtains position information of each of said apparatus having said radio memory means and identifies said area address based on the obtained position information.

5. A message transmission system according to claim 1, wherein said message creating apparatus creates said transmission message including control information which sets conditions of transmission timing of said transmission message, and
  wherein said message transmission apparatus transmits said stored transmission message if said arrival or said existence satisfies a condition of transmission timing which is set by said control information.

6. A message transmission system according to claim 5, wherein said control information which sets conditions of transmission timing is information which specifies transmission time or transmission waiting time.

7. A message transmission system according to claim 1, wherein said message transmission apparatus, if said apparatus having said radio communication means does not arrive in the area indicated by said area address, after a predetermined period of time, does not transmit said stored transmission message.

8. A message transmission system according to claim 1, wherein said apparatus having said radio communication means on which a user address is set as a destination of said transmission message receives said transmitted transmission message, and transmits a reply message in reply to said transmission message to said message transmission apparatus.

9. A message transmission system according to claim 8, wherein said message transmission apparatus receives said reply message, specifies a user address of a transmission source of said transmission message, based on the user address of said apparatus having said radio communication means which is a transmission source of said reply message, and transmits said received reply message to said specified user address having the transmission source of said transmission message as a destination.

10. A message transmission system according to claim 1, wherein said message transmission apparatus transmits said message to a plurality of said apparatuses having said radio communication means which exist in said area indicated by said area address which is a destination of said transmission message.

11. A message transmission system according to claim 1, wherein said message creating apparatus is any of said apparatus having said radio communication means.

* * * * *